(12) United States Patent
Okamoto

(10) Patent No.: US 8,166,771 B2
(45) Date of Patent: May 1, 2012

(54) REFRIGERATION SYSTEM

(75) Inventor: Masakazu Okamoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 627 days.

(21) Appl. No.: 12/305,647

(22) PCT Filed: Jun. 20, 2007

(86) PCT No.: PCT/JP2007/062431
§ 371 (c)(1),
(2), (4) Date: Dec. 18, 2008

(87) PCT Pub. No.: WO2007/148727
PCT Pub. Date: Dec. 27, 2007

(65) Prior Publication Data
US 2010/0000248 A1    Jan. 7, 2010

(30) Foreign Application Priority Data

Jun. 21, 2006  (JP) ................. 2006-171882

(51) Int. Cl.
*F25B 27/00* (2006.01)
(52) U.S. Cl. .................. 62/238.6; 62/512
(58) Field of Classification Search ............. 62/324.1, 62/238.6, 512, 513, 402, 619, 623, 172
See application file for complete search history.

(56) References Cited

U.S. PATENT DOCUMENTS

| | | | | |
|---|---|---|---|---|
| 4,622,053 A * | 11/1986 | Tomlinson et al. | ............ | 62/621 |
| 4,846,863 A * | 7/1989 | Tomlinson et al. | ............ | 62/622 |
| 6,923,016 B2 * | 8/2005 | Funakoshi et al. | ............ | 62/324.1 |
| 7,183,328 B2 * | 2/2007 | Hershkowitz et al. | ........ | 518/709 |
| 7,357,003 B2 * | 4/2008 | Ohara et al. | .................... | 62/620 |
| 7,803,253 B2 * | 9/2010 | Kanda et al. | .................... | 203/14 |
| 2003/0192343 A1 * | 10/2003 | Wilding et al. | ................. | 62/613 |
| 2004/0151958 A1 * | 8/2004 | Formanski et al. | ............. | 429/26 |
| 2006/0218939 A1 * | 10/2006 | Turner et al. | ....................... | 62/4 |
| 2007/0017250 A1 * | 1/2007 | Turner et al. | .................... | 62/613 |
| 2007/0062800 A1 * | 3/2007 | Kanda et al. | .................... | 203/12 |

FOREIGN PATENT DOCUMENTS

| | | |
|---|---|---|
| JP | 4-20749 A | 1/1992 |
| JP | 4-324067 A | 11/1992 |
| JP | 8-121889 A | 5/1996 |
| JP | 11-118266 A | 4/1999 |
| JP | 11-142007 A | 5/1999 |
| JP | 2001-317832 A | 11/2001 |
| JP | 2003-74990 A | 3/2003 |
| JP | 2003-74999 A | 3/2003 |
| JP | 2003-121018 A | 4/2003 |
| JP | 2006-38386 A | 2/2006 |
| JP | 2006-71137 A | 3/2006 |
| JP | 2006-125791 A | 5/2006 |

* cited by examiner

*Primary Examiner* — Mohammad Ali
(74) *Attorney, Agent, or Firm* — Birch, Stewart, Kolasch & Birch, LLP

(57) ABSTRACT

A heat source side circuit (14) includes a gas-liquid separator (35) for the separation of refrigerant flowing therein from an expander (31) into liquid refrigerant and gas refrigerant and a cooling means (36, 45, 53, 55) for the cooling of liquid refrigerant heading from the gas-liquid separator (35) to a utilization side circuit (11). Since the refrigerant exiting the gas-liquid separator (35) is in a saturated liquid form, it always changes state to a subcooled state whenever cooled by the cooling means (36, 45, 53, 55).

14 Claims, 13 Drawing Sheets

US 8,166,771 B2

REFRIGERATION SYSTEM

TECHNICAL FIELD

This invention relates to a refrigeration system capable of performing a cooling operation in which the refrigerant is circulated in a refrigerant circuit so that a heat source side heat exchanger functions as a condenser while a utilization side heat exchanger functions as an evaporator.

BACKGROUND ART

Refrigeration systems capable of carrying out a cooling operation have been known in the art. In such a cooling operation, refrigerant is circuited so that, in a refrigerant circuit including a heat source side heat exchanger and a utilization side heat exchanger which are connected together, the heat source side heat exchanger functions as a condenser while the utilization side heat exchanger functions as an evaporator. This type of refrigeration system is used, for example, as an air conditioner for providing air conditioning of an indoor space by means of an indoor unit in which a utilization side heat exchanger is mounted.

JP-A-2006-71137 (hereinafter referred to as the "patent document") discloses, as an example of such a type of refrigeration system, an air conditioner in which a compressor, an expander and an electric motor are connected together by a single drive shaft. The air conditioner of the patent document is configured such that the power resulting from the expansion of refrigerant in the expander is recovered and the recovered power is used to drive the compressor. A refrigerant adjustment tank is arranged downstream of the expander in the refrigerant circuit of the air conditioner. In a space cooling operation in which the refrigeration cycle is performed using an indoor heat exchanger as an evaporator, refrigerant in gas-liquid two-phase form exiting the expander flows into the refrigerant adjustment tank where the refrigerant is separated into liquid refrigerant and gas refrigerant. And the liquid refrigerant within the refrigerant adjustment tank is fed to the indoor heat exchanger.

DISCLOSURE OF THE INVENTION

Problems that the Invention Intends to Overcome

Incidentally, in a typical conventional refrigeration system, the refrigerant that is supplied to the utilization side circuit in the cooling operation is refrigerant resulting from gas-liquid separation in the refrigerant adjustment tank, that is, it is in a saturated liquid form. Consequently, the refrigerant flowing out from the refrigerant adjustment tank immediately changes state to a gas-liquid two-phase state due to the loss of pressure caused by piping. In other words, it is impossible to provide the supply of refrigerant in a liquid single-phase state to the utilization side circuit.

Besides, if the refrigerant changes state to a gas-liquid two-phase state on the way to the utilization side circuit, the wetness fraction gradually decreases, and the loss of pressure that the refrigerant undergoes gradually increases. In addition, the wetness fraction of refrigerant flowing into the utilization side heat exchanger decreases, as a result of which the capacity to provide cooling in the utilization side heat exchanger drops.

In light of the above drawbacks, the invention was made. Accordingly, a general object of the invention is to offer, for a refrigeration system capable of performing a cooling operation in which a heat source side heat exchanger functions as a condenser while a utilization side heat exchanger functions as an evaporator, a configuration capable of providing the supply of refrigerant in a liquid single-phase state to a utilization side circuit during a cooling operation.

Means for Overcoming the Problems

The invention provides, as a first aspect, a refrigeration system (20) provided with a refrigerant circuit (10) in which a heat source side circuit (14) including a compressor (30), an expander (31) and a heat source side heat exchanger (44) and a utilization side circuit (11) including a utilization side heat exchanger (41) are connected together for the performing of a refrigeration cycle by the circulation of refrigerant, which system is capable of carrying out a cooling operation in which the heat source side heat exchanger (44) functions as a condenser while the utilization side heat exchanger (41) functions as an evaporator. And the refrigeration system (20) is provided, in the heat source side circuit (14), with (a) a gas-liquid separator (35) for the separation of refrigerant flowing therein from the expander (31) into liquid refrigerant and gas refrigerant and (b) a cooling means (36, 45, 53, 55) for the cooling of liquid refrigerant heading from the gas-liquid separator (35) to the utilization side circuit (11) in the cooling operation.

The invention provides, as a second aspect according to the aforesaid first aspect, a refrigeration system that is characterized in that:

the utilization side circuit (11) includes, upstream of the utilization side heat exchanger (41) in the cooling operation, a utilization side expansion valve (51) whose degree of opening is variable; and the cooling means (36, 45) includes (a) a gas refrigerant pressure reducing mechanism (36), disposed in a gas supply pipe (37) for the feeding of gas refrigerant within the gas-liquid separator (35) to the compressor (30), for the pressure reduction of refrigerant in the gas supply pipe (37) and (b) a cooling heat exchanger (45) for the cooling of the liquid refrigerant heading from the gas-liquid separator (35) to the utilization side circuit (11) in the cooling operation by the exchange of heat with the refrigerant reduced in pressure by the gas refrigerant pressure reducing mechanism (36).

The invention provides, as a third aspect according to the aforesaid second aspect, a refrigeration system that is characterized in that:

the cooling means (36, 45, 53) includes a liquid refrigerant pressure reducing mechanism (53), disposed in a liquid supply pipe (52) for the feeding of some of the liquid refrigerant heading from the gas-liquid separator (35) to the utilization side circuit (11) to the cooling heat exchanger (45), for the pressure reduction of the refrigerant in the liquid supply pipe (52); and in the cooling heat exchanger (45), the liquid refrigerant heading from the gas-liquid separator (35) to the utilization side circuit (11) in the cooling operation is heat exchangeable also with the refrigerant reduced in pressure by the liquid refrigerant pressure reducing mechanism (53).

The invention provides, as a fourth aspect according to either the aforesaid second or third aspect, a refrigeration system that is characterizes in that:

the cooling means (36,45,55) includes a return refrigerant pressure reducing mechanism (55), disposed in an injection pipe (42) for the feeding of some of the refrigerant condensed in the heat source side heat exchanger (44) to the compressor (30), for the pressure reduction of the refrigerant in the injection pipe (42); and in the cooling heat exchanger (45), the liquid refrigerant heading from the gas-liquid separator (35) to the utilization side circuit (11) in the cooling operation is heat exchangeable also with the refrigerant reduced in pressure by the return refrigerant pressure reducing mechanism (55).

The invention provides, as a fifth aspect according to the aforesaid first aspect, a refrigeration system that is characterized in that that the cooling means (36,45) includes (a) a return refrigerant pressure reducing mechanism (55), disposed in an injection pipe (42) for the feeding of some of the refrigerant condensed in the heat source side heat exchanger (44) to the compressor (30), for the pressure reduction of the refrigerant in the injection pipe (42) and (b) a cooling heat exchanger (45) for the cooling of the liquid refrigerant heading from the gas-liquid separator (35) to the utilization side circuit (11) in the cooling operation by the exchange of heat with the refrigerant reduced in pressure by the return refrigerant pressure reducing mechanism (55).

The invention provides, as a sixth aspect, a refrigeration system (20) provided with a refrigerant circuit (10) in which a heat source side circuit (14) including a compressor (30), an expander (31) and a heat source side heat exchanger (44) and a utilization side circuit (11) including a utilization side heat exchanger (41) are connected together for the performing of a refrigeration cycle by the circulation of refrigerant, which system is capable of carrying out a cooling operation in which the heat source side heat exchanger (44) functions as a condenser while the utilization side heat exchanger (41) functions as an evaporator. And the refrigeration system (20) is provided, in the heat source side circuit (14), with (a) a return refrigerant pressure reducing mechanism (55), disposed in an injection pipe (42) for the feeding of some of the refrigerant downstream of the heat source side heat exchanger (44) to the compressor (30) in the cooling operation, for the pressure reduction of the refrigerant in the injection pipe (42) and (b) a subcooling heat exchanger (28) in which the refrigerant heading from the expander (31) to the utilization side circuit (11) in the cooling operation is brought into heat exchange with the refrigerant reduced in pressure by the return refrigerant pressure reducing mechanism (55) so as to thereby be cooled to a subcooled state.

The invention provides, as a seventh aspect according to any one of the aforesaid first to sixth aspects, a refrigeration system that is characterized in that the compressor (30) and the expander (31) are connected together by a single drive shaft.

The invention provides, as an eighth aspect according to any one of the aforesaid first to seventh aspects, a refrigeration system that is characterized in that a plurality of the utilization side circuits (11) are arranged in the refrigerant circuit (10) and are each connected in parallel to the heat source side circuit (14).

The invention provides, as a ninth aspect according to any one of the aforesaid first to eighth aspects, a refrigeration system that is characterized in that, in the refrigerant circuit (10), the refrigerant is circulated such that the high pressure of the refrigeration cycle exceeds the critical pressure of the refrigerant.

The invention provides, as a tenth aspect according to the aforesaid ninth aspect, a refrigeration system that is characterized in that the refrigerant circuit (10) is charged with carbon dioxide as the refrigerant.

Operation

In the first aspect of the invention, the refrigerant existing the expander (31) in the cooling operation flows into the gas-liquid separator (35) where the refrigerant is separated into liquid refrigerant and gas refrigerant. And the liquid refrigerant exiting the gas-liquid separator (35) is cooled by the cooling means (36, 45, 53, 55) on the way to the utilization side circuit (11). The liquid refrigerant exiting the gas-liquid separator (35), which is in a saturated state, is cooled by the cooling means (36, 45, 53, 55) to a subcooled state.

In the second aspect of the invention, in the cooling operation, the gas refrigerant within the gas-liquid separator (35) flows into the gas supply pipe (37) and is reduced in pressure by the gas refrigerant pressure reducing mechanism (36) and, as result, its temperature drops. And in the cooling heat exchanger (45), the refrigerant, whose temperature has been lowered by pressure reduction by the gas refrigerant pressure reducing mechanism (36), exchanges heat with the liquid refrigerant heading from the gas-liquid separator (35) to the utilization side circuit (11). As a result, the liquid refrigerant heading from the gas-liquid separator (35) to the utilization side circuit (11) is cooled to a subcooled state. In the second aspect of the invention, the gas refrigerant within the gas-liquid separator (35) is used to cool the liquid refrigerant heading from the gas-liquid separator (35) to the utilization side circuit (11).

In the third aspect of the invention, in the cooling operation, some of the liquid refrigerant heading from the gas-liquid separator (35) to the utilization side circuit (11) flows into the liquid supply pipe (52) and is reduced in pressure by the liquid refrigerant pressure reducing mechanism (53), as a result of which its temperature drops. In the cooling heat exchanger (45), the liquid refrigerant heading from the gas-liquid separator (35) to the utilization side circuit (11) is allowed to exchange heat not only with the refrigerant reduced in temperature by the gas refrigerant pressure reducing mechanism (36) but also with the liquid refrigerant reduced in temperature by the liquid refrigerant pressure reducing mechanism (53).

In the fourth aspect of the invention, in the cooling operation, some of the refrigerant condensed in the heat source side heat exchanger (44) flows into the injection pipe (42) and is reduced in pressure by the return refrigerant pressure reducing mechanism (55), as a result of which its temperature drops. In the cooling heat exchanger (45), the liquid refrigerant heading from the gas-liquid separator (35) to the utilization side circuit (11) is allowed to exchange heat not only with the refrigerant reduced in temperature by the gas refrigerant pressure reducing mechanism (36) but also with the refrigerant reduced in temperature by the return refrigerant pressure reducing mechanism (55).

In the fifth aspect of the invention, in the cooling operation, some of the refrigerant condensed in the heat source side heat exchanger (44) flows into the injection pipe (42) and is reduced in pressure by the return refrigerant pressure reducing mechanism (55), as a result of which its temperature drops. And in the cooling heat exchanger (45), the refrigerant reduced in temperature by the return refrigerant pressure reducing mechanism (55) exchanges heat with the liquid refrigerant heading from the gas-liquid separator (35) to the utilization side circuit (11). As a result, the liquid refrigerant heading from the gas-liquid separator (35) to the utilization side circuit (11) is cooled to a subcooled state.

In the sixth aspect of the invention, in the cooling operation, some of the refrigerant downstream of the heat source side heat exchanger (44) flows into the injection pipe (42) and is reduced in pressure by the return refrigerant pressure reducing mechanism (55), as a result of which its temperature drops. In the subcooling heat exchanger (28), the refrigerant exiting the expander (31) exchanges heat with the refrigerant reduced in temperature by the return refrigerant pressure reducing mechanism (55) so as to thereby be cooled to a subcooled state.

In the seventh aspect of the invention, the compressor (30) and the expander (31) are connected together by the single drive shaft. Accordingly, the power recovered in association with the expansion of refrigerant in the expander (31) is transferred through the drive shaft to the compressor (30).

In the eighth of the invention, the utilization side circuits (11) are each connected in parallel to the heat source side circuit (14). In the cooling operation, the refrigerant cooled by the cooling means (36, 45, 53, 55) of the heat source side circuit (14) to a subcooled state is fed to each of the utilization side circuits (11).

In the ninth aspect of the invention, the high pressure of the refrigeration cycle that is performed in the refrigerant circuit (10) is so set as to have a value higher than the critical pressure of the refrigerant. That is, the refrigerant delivered from the compressor (30) is in a supercritical state.

In the tenth aspect of the invention, carbon dioxide is used as refrigerant to be filled in the refrigerant circuit (10). The high pressure of the refrigeration cycle that is performed in the refrigerant circuit (10) is so set as to have a value higher than the critical pressure of carbon dioxide.

Advantageous Effects of the Invention

In the invention, it is arranged such that the liquid refrigerant heading from the heat source side circuit (14) to the utilization side circuit (11) in the cooling operation changes state to a subcooled state. The refrigerant in the subcooled state, even when it undergoes a pressure loss, will not immediately change state to a gas-liquid two-phase state but continues to remain in a liquid state. Therefore, it is possible to provide the supply of refrigerant in a liquid single-phase state to the utilization side circuit (11). As a result, the loss of pressure that the refrigerant undergoes becomes less in comparison with when the refrigerant changes state to a gas-liquid two-phase state by the time that it reaches the utilization side circuit (11). In addition, since the difference in refrigerant enthalpy between the entrance and exit of the utilization side heat exchanger (41) increases and the percentage of liquid refrigerant flowing into the utilization side heat exchanger (41) increases, this enhances the capacity to provide cooling per unit refrigerant flow rate in the utilization side heat exchanger (41). Therefore, it is possible to improve the operation efficiency of the refrigeration system (20).

In addition, in the second aspect of the invention, the gas refrigerant within the gas-liquid separator (35) is used for the cooling of liquid refrigerant that is fed from the gas-liquid separator (35) to the utilization side circuit (11). The gas-liquid separator (35) will not change state to the state in which gas refrigerant accumulates therein. This therefore facilitates the separation of refrigerant flowing in from the expander (31) into liquid refrigerant and gas refrigerant in the gas-liquid separator (35).

In addition, in the third aspect of the invention, in the cooling operation, the liquid refrigerant heading from the gas-liquid separator (35) to the utilization side circuit (11) is allowed to exchange heat not only with the refrigerant reduced in temperature by the gas refrigerant pressure reducing mechanism (36) but also with the liquid refrigerant reduced in temperature by the liquid refrigerant pressure reducing mechanism (53). Accordingly, in the cooling heat exchanger (45), the liquid refrigerant heading from the gas-liquid separator (35) to the utilization side circuit (11) is allowed to exchange heat with much more refrigerant, thereby making it possible to increase the degree of subcooling of the liquid refrigerant heading from the gas-liquid separator (35) to the utilization side circuit (11). This therefore ensures that liquid refrigerant is supplied to the utilization side circuit (11) without fail, even when it undergoes a relatively great pressure loss on the way to the utilization side circuit (11).

In addition, in the fourth aspect of the invention, in the cooling operation, the liquid refrigerant heading from the gas-liquid separator (35) to the utilization side circuit (11) is allowed to exchange heat not only with the refrigerant reduced in temperature by the gas refrigerant pressure reducing mechanism (36) but also with the refrigerant reduced in temperature by the return refrigerant pressure reducing mechanism (55). Accordingly, in the cooling heat exchanger (45), the liquid refrigerant heading from the gas-liquid separator (35) to the utilization side circuit (11) is allowed to exchange heat with much more refrigerant, thereby making it possible to increase the degree of subcooling of the liquid refrigerant heading from the gas-liquid separator (35) to the utilization side circuit (11). This therefore ensures that liquid refrigerant is supplied to the utilization side circuit (11) without fail, even when it undergoes a relatively great pressure loss on the way to the utilization side circuit (11).

In addition, in the seventh aspect of the invention, the compressor (30) and the expander (31) are connected together by the single drive shaft, whereby the power recovered in association with the expansion of refrigerant in the expander (31) is transmitted to the compressor (30). Accordingly, the power required for driving the compressor (30) can be saved, thereby making it possible to improve the operation efficiency of the refrigeration system (20).

In addition, in the eighth of the invention, in the cooling operation, the refrigerant, cooled to a subcooled state by the cooling means (36, 45, 53, 55) of the heat source side circuit (14), is fed to each utilization side circuit (11). As described above, the refrigerant in the subcooled state, even when it undergoes a pressure loss, will not immediately change state to a gas-liquid two-phase state but continues to remain in a liquid state. Accordingly, refrigerant in liquid single-phase form can be supplied, as it is, to each utilization side circuit (11).

Here, since the refrigerant that is fed from the heat source side circuit (14) to each utilization side circuit (11) is conventionally in the form of a liquid refrigerant in a saturated state after gas-liquid separation, it will immediately change state to a gas-liquid two-phase state due to the loss of pressure caused by piping. In the refrigerant in the gas-liquid two-phase state, its liquid and gas refrigerant portions differ from each other in gravity and pressure loss that they undergo during their travelling. This produces the possibility that there is generated a bias in the state of refrigerant flowing into each utilization side circuit (11), i.e., the percentage of liquid refrigerant and gas refrigerant. Especially, if the utilization side circuits (11) are installed at different levels of height from each other, this facilitates the flow of liquid refrigerant into a utilization side circuit (11) at lower level of height but impedes the flow of liquid refrigerant into a utilization side circuit (11) at higher level of height, thereby causing the problem that it is unable to accomplish satisfactory cooling capacity in some cases. In the eighth aspect of the invention, however, refrigerant in a liquid single-phase state can be supplied, as it is, to each utilization side circuit (11), and there is generated no bias in the state of refrigerant in each utilization side circuit (11). Accordingly, it is prevented that any one of the utilization side circuits (11) becomes short of refrigerant in the cooling operation, regardless of the layout of the utilization side circuits (11).

Figure 1:
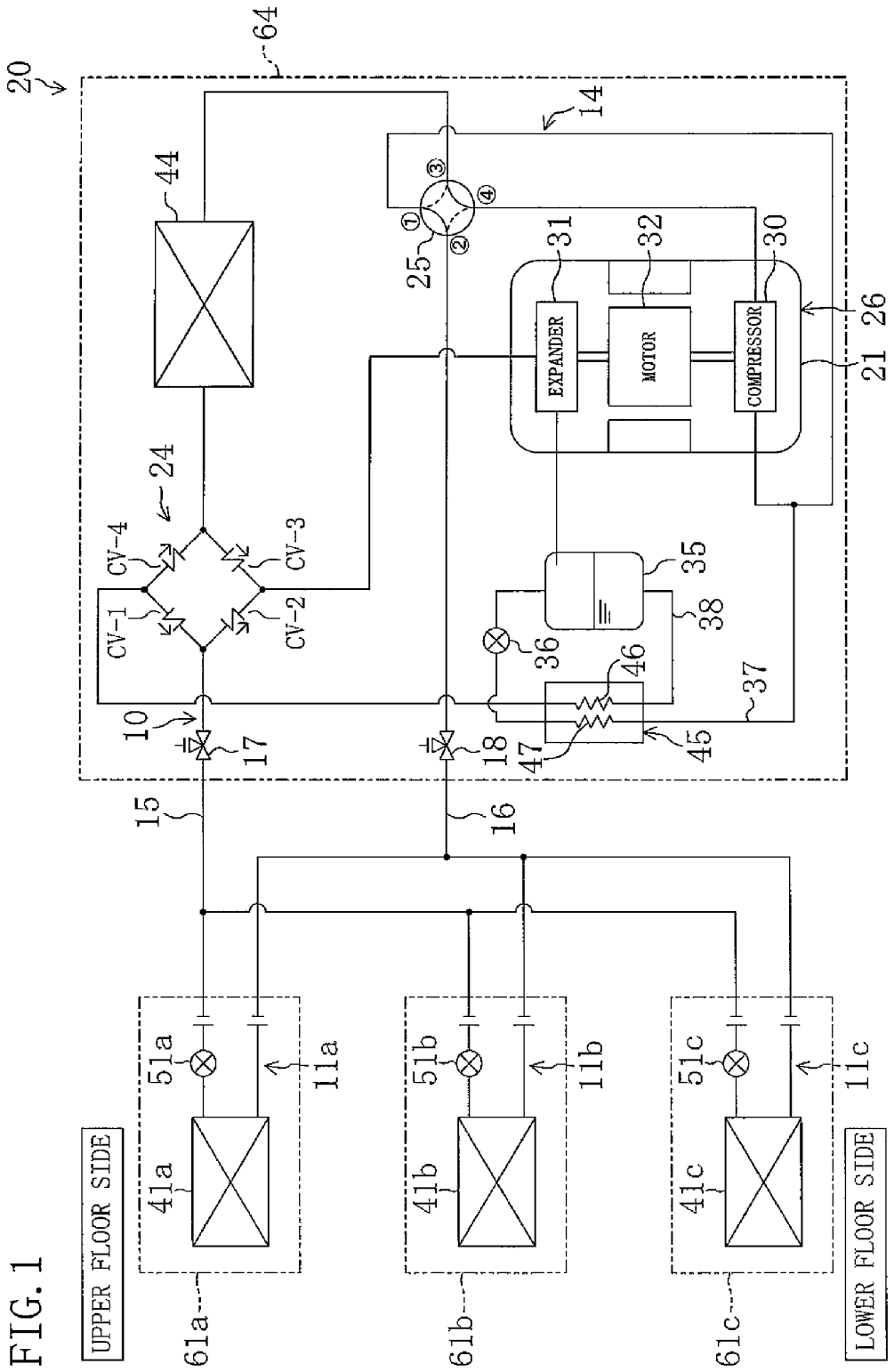
FIG. 1 is a schematic configuration diagram of an air conditioner according to a first embodiment of the invention.

REFERENCE NUMERALS IN THE DRAWINGS 10 refrigerant circuit
11 indoor circuit (utilization side circuit)
14 outdoor circuit (utilization side circuit)
20 air conditioner (refrigeration system)
28 internal heat exchanger (subcooling heat exchanger)
30 compressor
30a lower-stage side compression mechanism
30b higher-stage side compression mechanism
31 expander
35 gas-liquid separator
36 gas refrigerant expansion valve (cooling means, gas refrigerant pressure reducing mechanism)
37 gas supply pipe
41 indoor heat exchanger (utilization side heat exchanger)
42 injection pipe
44 outdoor heat exchanger (heat source side heat exchanger)
45 internal heat exchanger (cooling means, cooling heat exchanger)
51 indoor expansion valve (utilization side expansion valve)
52 liquid supply pipe
53 liquid refrigerant expansion valve (cooling means, liquid refrigerant pressure reducing mechanism)
55 return refrigerant expansion valve (cooling means, return refrigerant pressure reducing mechanism)

BEST MODE FOR CARRYING OUT THE INVENTION

In the following, embodiments of the invention will be described in detail with reference to the accompanying drawings.

First Embodiment of the Invention

The following is a description of a first embodiment of the present invention. An air conditioner (20) of the first embodiment is formed by a refrigeration system (20) according to the invention. As shown in FIG. 1, the air conditioner (20) is provided with a single outdoor unit (64) and three indoor units (61a, 61b, 61c). The number of the indoor units (61a, 61b, 61c) shown here is merely exemplary.

These three indoor units (61a, 61b, 61c) are respectively, a first indoor unit (61a), a second indoor unit (61b) and a third indoor unit (61c). These three indoor units (61a, 61b, 61c) are installed on different floors in a building, wherein the first indoor unit (61a), the second indoor unit (61b) and the third indoor unit (61c) are installed, respectively, on an upper level floor, on an intermediate level floor, and on a lower level floor. The outdoor unit (64) is installed on the lowermost level floor of the building.

The air conditioner (20) of the first embodiment includes a refrigerant circuit (10) which is charged with carbon dioxide ($CO_2$) as a refrigerant. In the refrigerant circuit (10), the refrigerant ($CO_2$) is circulated to thereby perform a vapor compression refrigeration cycle. In the refrigeration cycle, its high pressure is so set as to have a value higher than the critical pressure of carbon dioxide.

The refrigerant circuit (10) includes three indoor circuits (11a, 11b, 11c) which are utilization side circuits and a single outdoor circuit (14) which is a heat source side circuit. The indoor circuits (11a, 11b, 11c) are connected in parallel to the outdoor circuit (14) by a first interunit pipe (15) and a second interunit pipe (16). More specifically, one end of the first interunit pipe (15) is connected to a first closing valve (17) of the outdoor circuit (14) while the other end thereof is divided into three branches connected respectively to the liquid sides of the indoor circuits (11a, 11b, 11c). One end of the second interunit pipe (16) is connected to a second closing valve (18) of the outdoor circuit (14) while the other end thereof is divided into three branches connected respectively to the gas sides of the indoor circuits (11a, 11b, 11c).

The outdoor circuit (14) is accommodated in an outdoor unit (64). The outdoor circuit (14) includes a compression/expansion unit (26), an outdoor heat exchanger (44), a gas-liquid separator (35), a gas refrigerant expansion valve (36), an internal heat exchanger (45), a four-way selector valve (25) and a bridge circuit (24). The internal heat exchanger (45) which is a cooling heat exchanger and the gas refrigerant expansion valve (36) which is a gas refrigerant pressure reducing mechanism together constitute a cooling means (36, 45) according to the invention. The outdoor unit (64) is provided with an outdoor fan (not shown) for the supply of outdoor air to the outdoor heat exchanger (44).

The compression/expansion unit (26) includes a casing (21) which is a vertically-elongated, circular cylinder-shaped hermetic container. The casing (21) houses a compressor (30), an expander (31) and an electric motor (32). Within the casing (21), the compressor (30), the electric motor (32) and the expander (31) are arranged from bottom to top in that order and are connected together by a single drive shaft.

The compressor (30) and the expander (31) are each formed by a respective fluid machine of the positive displacement type (such as a rotary fluid machine of the swinging piston type, a rotary fluid machine of the rolling piston type, a fluid machine of the scroll type et cetera). The compressor (30) compresses refrigerant ($CO_2$) drawn thereinto to above the critical pressure of the refrigerant. The expander (31) expands refrigerant ($CO_2$) admitted thereto for the recovery of power (expansion power). The compressor (30) is rotationally driven both by the power recovered by the expander (31) and by the power generated by energizing the electric motor (32). The electric motor (32) is provided with the supply of ac electric power having a predetermined frequency from an inverter (not shown). The compressor (30) is configured such that its capacity is rendered variable in response to changes in the frequency of electric power supplied to the electric motor (32). The compressor (30) and the expander (31) rotate at the same rotational speed at all times.

The outdoor heat exchanger (44) which is a heat source side heat exchanger is formed as a fin and tube heat exchanger of the cross fin type. The outdoor heat exchanger (44) is supplied by the outdoor fan with outdoor air. In the outdoor heat exchanger (44), heat is exchanged between the outdoor air and the refrigerant. One end of the outdoor heat exchanger (44) is connected to a third port of the four-way selector valve (25) while the other end thereof is connected to the bridge circuit (24).

The gas-liquid separator (35) is a hermetic container shaped like a vertically-elongated circular cylinder. The gas-liquid separator (35) is operable to adjust the amount of refrigerant circulating in the refrigerant circuit (10), and is connected through refrigerant piping to the outflow side of the expander (31). This refrigerant piping is opened in an upper portion of the inner space of the gas-liquid separator (35) so that it opens to a gas space within the gas-liquid separator (35). Connected to the bottom of the gas-liquid separator (35) is liquid piping (38) that is connected to the bridge circuit (24). On the other hand, connected to the top of the gas-liquid separator (35) is a gas supply pipe (37) that is connected to the suction side of the compressor (30). In addition, the gas refrigerant expansion valve (36) is provided on the gas supply pipe (37). The gas refrigerant expansion valve (36) is formed by an electronic expansion valve whose degree of opening is variable.

The internal heat exchanger (45) is disposed astride the gas supply pipe (37) and the liquid piping (38). The internal heat exchanger (45) includes a first flowpath (46) formed in the middle of the liquid piping (38) and a second flowpath (47) formed in the middle of the gas supply pipe (37). In the internal heat exchanger (45), the first and second flowpaths (46, 47) are arranged adjacently to each other so that heat is exchanged between the refrigerant in the first flowpath (46) and the refrigerant in the second flowpath (47). In a space cooling operation which is a cooling operation, in the internal heat exchanger (45), heat is exchanged between the liquid refrigerant exiting from the bottom of the gas-liquid separator (35) and flowing through the first flowpath (46) and the refrigerant exiting from the top of the gas-liquid separator (35), reduced in temperature by pressure reduction by the gas refrigerant expansion valve (36) and flowing through the second flowpath (47).

The bridge circuit (24) is composed of four check valves (CV-1, CV-2, CV-3, CV-4) that are connected like a bridge. The liquid piping (38) is connected to the inflow side of each of the first and fourth check valve (CV-1, CV4) of the bridge circuit (24). The outflow side of each of the second and third check valves (CV-2, CV-3) is connected to the inflow side of the expander (31). Both the outflow side of the first check valve (CV-1) and the inflow side of the second check valve (CV-2) are connected to the first closing valve (17). Both the inflow side of the third check valve (CV-3) and the outflow side of the fourth check valve (CV-4) are connected to the outdoor heat exchanger (44).

The first port of the four-way selector valve (25) is connected to the suction side of the compressor (30). The second port is connected to the second closing valve (18). The third port is connected to the outdoor heat exchanger (44). The fourth port is connected to the discharge side of the compressor (30). The four-way selector valve (25) is configured such that its operation is switchable between a first state (indicated by solid line in FIG. 1) and a second state (indicated by broken line in FIG. 1). More specifically, when the four-way selector valve (25) is placed in the first state, the first and second ports are brought into fluid communication with each other while the third and fourth ports are brought into fluid communication with each other. On the other hand, when the four-way selector valve (25) is placed in the second state, the first and third ports are brought into fluid communication with each other while the second and fourth ports are brought into fluid communication with each other.

The indoor circuits (11a, 11b, 11c) are accommodated respectively in the indoor units (61a, 61b, 61c). In each of the indoor circuits (11a, 11b, 11c), an indoor heat exchanger (41a, 41b, 41c) which is a utilization side heat exchanger and an indoor expansion valve (51a, 51b, 51c) which is a utilization side expansion valve are arranged from its gas to liquid side in that order. Each of the indoor units (61a, 61b, 61c) is provided with a respective indoor fan (not shown) for the supply of indoor air to its associated indoor heat exchanger (41a, 41b, 41c).

Each indoor heat exchanger (41a, 41b, 41c) is formed as a fin and tube heat exchanger of the cross fin type. Each indoor heat exchanger (41a, 41b, 41c) is provided with the supply of indoor air from its associated indoor fan. In each indoor heat exchanger (41a, 41b, 41c), heat is exchanged between the indoor air and the refrigerant. In addition, each indoor expansion valve (51a, 51b, 51c) is formed by an electronic expansion valve whose degree of opening is variable.

Running Operation

The following is a description of the running operation of the air conditioner (20). The air conditioner (20) is operable to perform a space cooling operation (cooling operation) and a space heating operation and its operation is selectively switched, by the four-way selector valve (33), to the space cooling or heating operation.

Space Heating Operation

In the space heating operation, the four-way selector valve (25) is set in the second state as indicated by broken line in FIG. 1. The degree of opening of each indoor expansion valve (51a, 51b, 51c) is individually regulated. The gas refrigerant expansion valve (36) is held in the fully opened state. If, in this condition, the compressor (30) is driven, this causes refrigerant to circulate in the refrigerant circuit (10), whereby the refrigeration cycle is performed. At that time, the indoor heat exchanger (41a, 41b, 41c) functions as a condenser while the outdoor heat exchanger (44) functions as an evaporator.

More specifically, the refrigerant compressed to above its critical pressure is delivered from the compressor (30). This high-pressure refrigerant is distributed by way of the second interunit pipe (16) to each indoor circuit (11a, 11b, 11c). The refrigerant distributed to the indoor circuit (11a, 11b, 11c) exchanges heat with indoor air in the indoor heat exchanger (41a, 41b, 41c). In this heat exchange, the refrigerant dissipates heat to the indoor air and condenses while on the other hand the indoor air is heated and then supplied to the indoor space. Flows of the refrigerant condensed in the indoor heat exchangers (41a, 41b, 41c) join together in the first interunit pipe (15). Then, the refrigerant flows into the outdoor circuit (14).

The refrigerant admitted to the outdoor circuit (14) flows into the expander (31) where it is reduced in pressure. The refrigerant reduced in pressure by the expander (31) flows into the gas-liquid separator (35) where it is separated into liquid refrigerant and gas refrigerant. The liquid refrigerant within the gas-liquid separator (35), after flowing out from the liquid piping (38), flows into the outdoor heat exchanger (44). In the outdoor heat exchanger (44), the refrigerant admitted thereto exchanges heat with outdoor air. In this heat exchange, the refrigerant absorbs heat from the outdoor air and evaporates. The refrigerant evaporated in the outdoor heat exchanger (44) is drawn into the compressor (30) where it is again compressed and then delivered out therefrom.

Space Cooling Operation

In the space cooling operation, the four-way selector valve (25) is set in the first state as indicated by solid line in FIG. 1. The degree of opening of each indoor expansion valve (51a, 51b, 51c) is individually regulated. In addition, the degree of opening of the gas refrigerant expansion valve (36) is properly regulated. If, in this condition, the compressor (30) is driven, this causes refrigerant to circulate in the refrigerant circuit (10), whereby the refrigeration cycle is performed. At that time, the outdoor heat exchanger (44) functions as a condenser while on the other hand the indoor heat exchanger (41a, 41b, 41c) functions as an evaporator.

More specifically, the refrigerant compressed to above its critical pressure is delivered out from the compressor (30). This high-pressure refrigerant flows into the outdoor heat exchanger (44), dissipates heat to outdoor air and condenses. The refrigerant condensed in the outdoor heat exchanger (44) flows into the expander (31) where it is reduced in pressure. The refrigerant reduced in pressure by the expander (31) flows into the gas-liquid separator (35) where it is separated into liquid refrigerant and gas refrigerant. The liquid refrigerant in a saturated state within the gas-liquid separator (35), after flowing out from the liquid piping (38), flows into the first flowpath (46) of the internal heat exchanger (45). Meanwhile, the gas refrigerant in a saturated state within the gas-liquid separator (35) flows out from the gas supply pipe (37), is reduced in pressure by the gas refrigerant expansion valve (36) and then flows into the second flowpath (47) of the internal heat exchanger (45). In the internal heat exchanger (45), heat is exchanged between the refrigerant in the first flowpath (46) and the refrigerant in the second flowpath (47).

Figure 2:
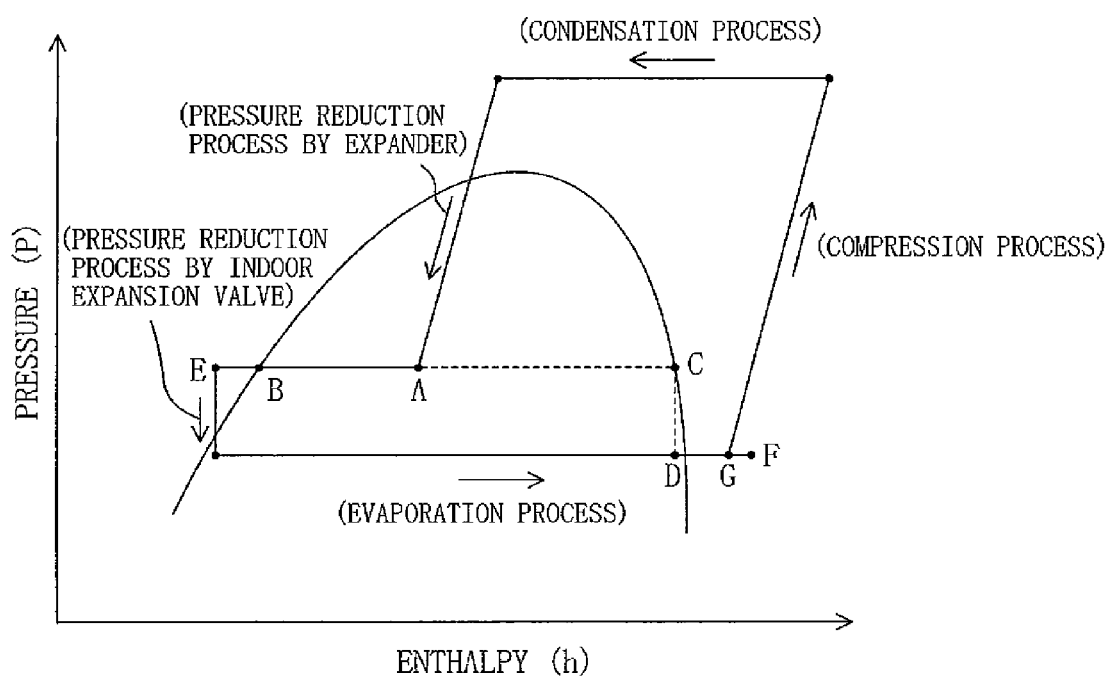
FIG. 2 is a Mollier diagram representing a refrigeration cycle in a space cooling operation of the air conditioner according to the first embodiment.

Here, FIG. 2 provides a description of the change in state of the refrigerant up to the time that the liquid and gas refrigerant from the gas-liquid separator (35) exchange heat in the internal heat exchanger (45). First, refrigerant in the state of point A flows into the gas-liquid separator (35). In the gas-liquid separator (35), the refrigerant admitted thereto is separated into a saturated liquid of point B and a saturated gas of point C. The refrigerant of point B flows into the first flowpath (46) of the internal heat exchanger (45). On the other hand, the refrigerant of point C is reduced in pressure by the gas refrigerant expansion valve (36) to change state to the state of point D (gas-liquid two-phase state) and then flows into the second flowpath (47) of the internal heat exchanger (45). In the internal heat exchanger (45), heat is exchanged between the refrigerant in the state of point B and the refrigerant in the state of point D. The refrigerant flowing into the first flowpath (46) is higher in temperature than the refrigerant flowing into the second flowpath (47). That is, since the refrigerant in the first flowpath (46) is cooled by the refrigerant in the second flowpath (47), it changes state to a subcooled state indicated by point E. On the other hand, since the refrigerant in the second flowpath (47) is heated by the refrigerant in the first flowpath (46), it changes state to a superheated state indicated by point F.

The liquid refrigerant after passage through the first flowpath (46) is distributed via the first interunit pipe (15) to each of the indoor circuits (11a, 11b, 11c). Since the liquid refrigerant after passage through the first flowpath (46) has changed state to a subcooled state, it will not change state to a gas-liquid two-phase state although its pressure drops due to the loss of pressure caused by the refrigerant piping by the time that it is distributed to each indoor circuit (11a, 11b, 11c). It is therefore prevented that the lower the level of installation floor height of the indoor circuit (11a, 11b, 11c), the higher the percentage of liquid refrigerant, and thus, the higher the level of installation floor height of the indoor circuit (11a, 11b, 11c), the higher the percentage of gas refrigerant, whereby each indoor circuit (11a, 11b, 11c) is provided with the supply of an amount of refrigerant in a liquid single-phase state corresponding to the degree of opening of its associated indoor expansion valve (51a, 51b, 51c). The liquid refrigerant distributed to the indoor circuit (11a, 11b, 11c) is reduced in pressure by the indoor expansion valve (51a, 51b, 51c) and then flows into the indoor heat exchanger (41a, 41b, 41c).

The low-pressure refrigerant admitted to the indoor heat exchanger (41a, 41b, 41c) exchanges heat with indoor air. In this heat exchange, the refrigerant absorbs heat from the indoor air and evaporates while on the other hand the indoor air is cooled and then supplied to the indoor space. Flows of the refrigerant evaporated in the indoor heat exchangers (41a, 41b, 41c) join together in the second interunit pipe (16). Then, the refrigerant flows into the outdoor circuit (14).

The refrigerant admitted to the outdoor circuit (14) joins the refrigerant heading from the second flowpath (47) to the compressor (30) and is drawn into the compressor (30). The refrigerant drawn into the compressor (30) is again compressed and then delivered out therefrom.

Incidentally, in the air conditioner (20) of the first embodiment, in order to prevent the compression of liquid in the compressor (30), it is controlled that refrigerant that is drawn into the compressor (30) is in a superheated state. If no refrigerant in a superheated state will flow in from the gas supply pipe (37), the degree of opening of the indoor expansion valve (51a, 51b, 51c) is adjusted so that, in each indoor unit (61a, 61b, 61c), the degree of superheat at the exit of the indoor heat exchanger (41a, 41b, 41c) has a predefined value (for example, 5 degrees).

On the other hand, if refrigerant in a superheated state (i.e., in the state of point F in FIG. 2) flows in from the gas supply pipe (37), the degree of superheat of refrigerant that is drawn into the compressor (30) will increase if it joins the refrigerant from the gas supply pipe (37), even when the degree of superheat of refrigerant that is returned from the indoor unit (61a, 61b, 61c) to the compressor (30) is reduced. This therefore makes it possible that the degree of superheat of the refrigerant at the exit of each indoor heat exchanger (41a, 41b, 41c) can be made to have a smaller value than the foregoing predefined value (for example, 5 degrees). As a result, in each indoor heat exchanger (41a, 41b, 41c), the length of the flowpath of the refrigerant in a gas-liquid two-phase state is extended, thereby making it possible to increase the amount of heat exchange in each indoor heat exchanger (41a, 41b, 41c).

Advantageous Effects of the First Embodiment

In the first embodiment, it is arranged that the liquid refrigerant heading from the outdoor circuit (14) to the indoor circuit (11) in the cooling operation changes state to a subcooled state. The refrigerant in the subcooled state, even when it undergoes a pressure loss, will not immediately change state to a gas-liquid two-phase state but continues to remain in a liquid state. Therefore, it is possible that refrigerant in a liquid single-phase state is supplied, as it is, to the indoor circuit (11). As a result, the loss of pressure that the refrigerant undergoes becomes less in comparison with when the refrigerant changes state to a gas-liquid two-phase state by the time that it reaches the indoor circuit (11). In addition, both the difference in refrigerant enthalpy between the entrance and exit of the outdoor heat exchanger (41) and the percentage of liquid refrigerant flowing into the indoor heat exchange (41) increase, thereby achieving improvement in cooling capacity per unit refrigerant flow rate in the indoor heat exchanger (41). Therefore, it is possible to improve the operation efficiency of the refrigeration system (20).

In addition, in the first embodiment, by the supply of refrigerant in the superheated state from the gas supply pipe (37) to the suction side of the compressor (30) in the cooling operation, it becomes possible to set the degree of superheat of the refrigerant at the exit of the indoor heat exchanger (41) at low values. Accordingly, it is possible to increase the amount of heat exchange in each indoor heat exchanger (41), thereby making it possible to improve the operation efficiency of the air conditioner (20).

Besides, in the first embodiment, the gas refrigerant within the gas-liquid separator (35) is used for the cooling of liquid refrigerant that is fed from the gas-liquid separator (35) to the indoor circuit (11). The gas-liquid separator (35) will not enter such a state that gas refrigerant accumulates therein. This therefore facilitates the separation of the refrigerant flowing in from the expander (31) into liquid refrigerant and gas refrigerant in the gas-liquid separator (35).

In addition, in the first embodiment, the compressor (30) and the expander (31) are connected together by the single drive shaft, whereby the power recovered in association with the expansion of refrigerant in the expander (31) is transmitted to the compressor (30). Accordingly, the power required for driving the compressor (30) can be saved, thereby making it possible to improve the operation efficiency of the air conditioner (20).

In addition, in the first embodiment, in the cooling operation, the refrigerant cooled to a subcooled state by the cooling means (36, 45, 53, 55) of the outdoor circuit (14) is fed to each indoor circuit (11). As described above, the refrigerant in the subcooled state, even when it undergoes a pressure loss, will not immediately change to a gas-liquid two-phase state but continues to remain in a liquid state. Accordingly, it is possible that refrigerant in a liquid single-phase state can be supplied, as it is, to each indoor circuit (11), whereby there is generated no bias in the state of refrigerant in each indoor circuit (11). Accordingly, it can be prevented that any one of the indoor circuits (11) becomes short of refrigerant in the cooling operation, regardless of the layout of the indoor circuits (11).

In addition, in the first embodiment, by the use of carbon dioxide as a refrigerant, it become possible to make the difference between the high and low pressure of the refrigeration cycle greater in comparison with when other types of refrigerants are used. Accordingly, the recovery power of the expander is improved, thereby making it possible to improve the operation efficiency of the refrigeration system.

First Modification of the First Embodiment

Figure 3:
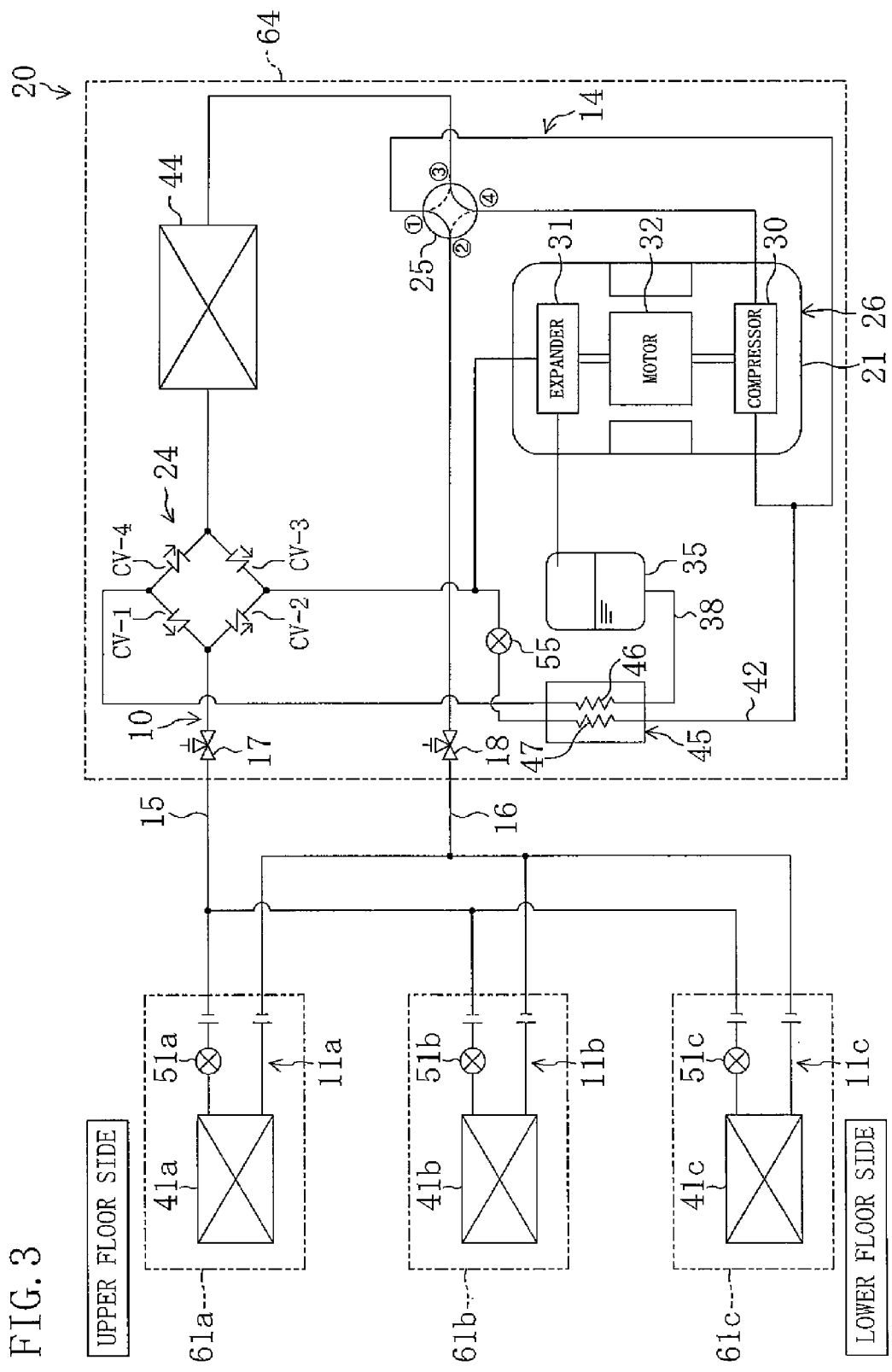
FIG. 3 is a schematic configuration diagram of an air conditioner according to a first modification of the first embodiment.

The following is a description of a first modification of the first embodiment. In the first modification, the heat source side circuit (14) includes an injection pipe (42), as shown in FIG. 3. One end of the injection pipe (42) is connected between the bridge circuit (24) and the inflow side of the expander (31) while the other end thereof is connected to the suction side of the compressor (30). The injection pipe (42) is provided with a return refrigerant expansion valve (55) which is a return refrigerant pressure reducing mechanism. The return refrigerant expansion valve (55) is formed by an electronic expansion valve whose degree of opening is variable. The internal heat exchanger (45) is disposed astride the liquid piping (38) and the injection pipe (42). The second flowpath (47) forms a part of the injection pipe (42). In the first modification, the internal heat exchanger (45) and the return refrigerant expansion valve (55) constitute a cooling means (45, 55) according to the invention.

In the space cooling operation, the return refrigerant expansion valve (55) is placed in the opened state. Upon the placement of the return refrigerant expansion valve (55) in the opened state, some of the refrigerant condensed in the outdoor heat exchanger (44) flows into the injection pipe (42), is reduced in pressure by the return refrigerant expansion valve (55) and then flows into the second flowpath (47) of the internal heat exchanger (45). In the internal heat exchanger (45), heat exchange occurs between the liquid refrigerant admitted to the first flowpath (46) from the bottom of the gas-liquid separator (35) and the refrigerant admitted to the second flowpath (47). As a result, the refrigerant in the first flowpath (46) is cooled by the refrigerant in the second flowpath (47) and changes state to a subcooled state, as in the first embodiment.

Second Modification of the First Embodiment

Figure 4:
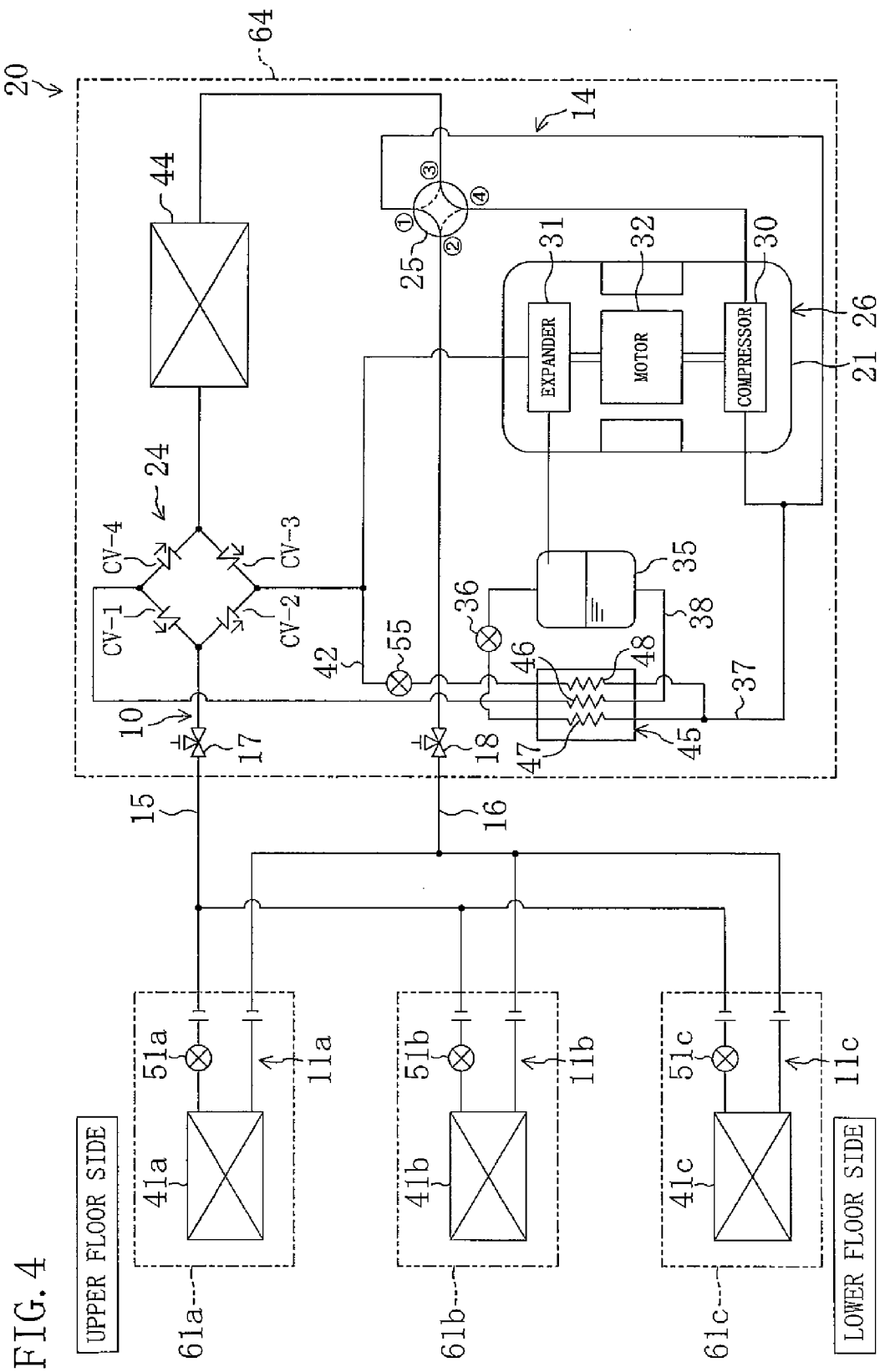
FIG. 4 is a schematic configuration diagram of an air conditioner according to a second modification of the first embodiment.

The following is a description of a second modification of the first embodiment. As shown in FIG. 4, in the second modification, the heat source side circuit (14) includes an injection pipe (42), as in the first modification. One end of the injection pipe (42) is connected between the bridge circuit (24) and the inflow side of the expander (31) while the other end thereof is connected, upstream of the internal heat exchanger (45), to the gas supply pipe (37). The injection pipe (42) is provided with a return refrigerant expansion valve (55) which is a return refrigerant pressure reducing mechanism. The return refrigerant expansion valve (55) is formed by an electronic expansion valve whose degree of opening is variable.

The internal heat exchanger (45) is disposed astride the gas supply pipe (37), the liquid piping (38) and the injection pipe (42). The internal heat exchanger (45) includes a first flowpath (46), a second flowpath (47) and a third flowpath (48) and is configured such that the refrigerant in the first flowpath (46) exchanges heat with both the refrigerant in the second flowpath (47) and the refrigerant in the third flowpath (48). The third flowpath (48) forms a part of the injection pipe (42). In the second modification, the internal heat exchanger (45), the gas refrigerant expansion valve (36) and the return refrigerant expansion valve (55) constitute a cooling means (36, 45, 55).

In the space cooling operation, both or either one of the gas refrigerant expansion valve (36) and the return refrigerant expansion valve (55) is placed in the opened state. Upon the opening of the gas refrigerant expansion valve (36), the refrigerant reduced in pressure by the gas refrigerant expansion valve (36) flows into the second flowpath (47), as in the first embodiment. On the other hand, upon the opening of the return refrigerant expansion valve (55), some of the refrigerant condensed in the outdoor heat exchanger (44) flows into the injection pipe (42), is reduced in pressure by the return refrigerant expansion valve (55) and flows into the third flowpath (48).

In the cooling operation of the second modification, if both the gas refrigerant expansion valve (36) and the return refrigerant expansion valve (55) are opened, this causes the liquid refrigerant in the first flowpath (46) heading to the indoor circuit (11) to exchange heat not only with the refrigerant reduced in temperature by the gas refrigerant expansion valve (36) but also with the refrigerant reduced in temperature by the return refrigerant expansion valve (55). Accordingly, in the cooling heat exchanger (45), the liquid refrigerant in the first flowpath (46) is brought into heat exchange with much more refrigerant, thereby making it possible to increase the degree of subcooling of the liquid refrigerant in the first flowpath (46) heading to the indoor circuit (11). This ensures that liquid refrigerant is supplied to the indoor circuit (11) without fail, even when it undergoes a relatively great pressure loss on the way to the indoor circuit (11).

In addition, in the second modification, the compressor (30) and the expander (31) are connected together by a single drive shaft, which means that the rotational speed of the compressor (30) and the rotational speed of the expander (31) can not be controlled separately. Consequently, in order to properly set the operation state of the refrigeration cycle (for example, high pressure, low pressure et cetera), it is required to provide a means capable of adjusting the ratio of the passage amount of refrigerant of the compressor (30) and the passage amount of refrigerant of the expander (31). If, with respect to the balance when the operation state is adequate, the amount of refrigerant passable through the compressor (30) is excessively small as compared to the amount of refrigerant passable through the expander (31), then the return refrigerant expansion valve (55) is opened so that the amount of refrigerant passable through the expander (31) decreases. This makes it possible that the ratio of the passage amount of refrigerant of the compressor (30) and the passage amount of refrigerant of the expander (31) is adjusted to an adequate state. On the other hand, if, with respect to the balance when the operation state is adequate, the amount of refrigerant passable through the compressor (30) is excessively great as compared to the amount of refrigerant passable through the expander (31), then the gas refrigerant expansion valve (36) is opened so that the density of refrigerant that is drawn into the compressor (30) decreases. This makes it possible that the ratio of the passage amount of refrigerant of the compressor (30) and the passage amount of refrigerant of the expander (31) is adjusted to an adequate state.

In addition, with respect to the second modification, the other end of the injection pipe (42) may be connected upstream of the internal heat exchanger (45) so that the refrigerant reduced in pressure by the gas refrigerant expansion valve (36) and the refrigerant reduced in pressure by the return refrigerant expansion valve (55) flow into the second flowpath (47) of the internal heat exchanger (45). In this case, the internal heat exchanger (45) is arranged astride two pipes, i.e., the gas supply pipe (37) and the liquid piping (38). The third flowpath (48) is not arranged in the internal heat exchanger (45).

Third Modification of the First Embodiment

Figure 5:
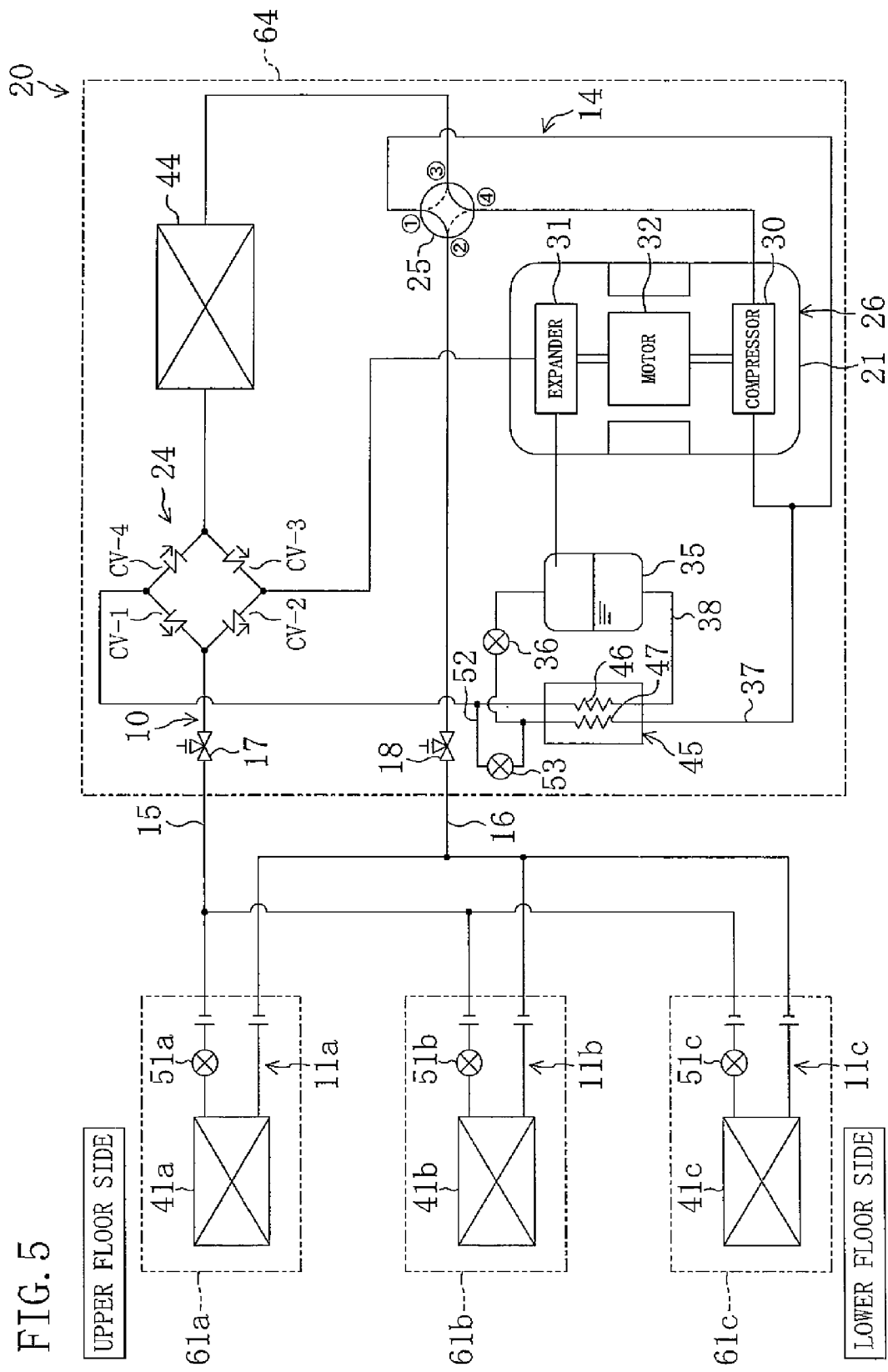
FIG. 5 is a schematic configuration diagram of an air conditioner according to a third modification of the first embodiment.

The following is a description of a third modification of the first embodiment. In the third modification, a liquid supply pipe (52) is provided between the liquid piping (38) and the gas supply pipe (37), as illustrated in FIG. 5. One end of the liquid supply pipe (52) is connected, downstream of the internal heat exchanger (45), to the liquid piping (38) while the other end thereof is connected, between the gas refrigerant expansion valve (36) and the internal heat exchanger (45), to the gas supply pipe (37). The liquid supply pipe (52) is provided with a liquid refrigerant expansion valve (53) which is a liquid refrigerant pressure reducing mechanism. The liquid refrigerant expansion valve (53) is formed by an electronic expansion valve whose degree of opening is variable. In the third modification, the internal heat exchanger (45), the gas refrigerant expansion valve (36) and the liquid refrigerant expansion valve (53) constitute a cooling means (36, 45, 53). In addition, one end of the liquid supply pipe (52) may be connected, upstream of the internal heat exchanger (45), to the liquid piping (38).

In the space cooling operation, both or either one of the gas refrigerant expansion valve (36) and the liquid refrigerant expansion valve (53) is placed in the opened state. Upon the opening of the gas refrigerant expansion valve (36), the refrigerant reduced in pressure by the gas refrigerant expansion valve (36) flows into the second flowpath (47), as in the first embodiment. On the other hand, upon the opening of the liquid refrigerant expansion valve (53), some of the liquid refrigerant heading from the gas-liquid separator (35) to the indoor circuit (11) flows into the liquid supply pipe (52). The liquid refrigerant admitted to the liquid supply pipe (52) is reduced in pressure by the liquid refrigerant expansion valve (53) and then flows into the second flowpath (47).

In the third modification, if, in the cooling operation, both the gas refrigerant expansion valve (36) and the liquid refrigerant expansion valve (53) are opened, this causes the liquid refrigerant in the first flowpath (46) heading to the indoor circuit (11) to exchange heat not only with the refrigerant reduced in temperature by the gas refrigerant expansion valve (36) but also with the refrigerant reduced in temperature by the liquid refrigerant expansion valve (53). Accordingly, in the cooling heat exchanger (45), the liquid refrigerant in the first flowpath (46) is brought into heat exchange with much more refrigerant, thereby making it possible to increase the degree of subcooling of the liquid refrigerant in the first flowpath (46) heading to the indoor circuit (11). This ensures that liquid refrigerant is supplied to the indoor circuit (11) without fail, even when it undergoes a relatively great pressure loss on the way to the indoor circuit (11).

In addition, in the third modification, it is required, as described above, to adjust the ratio of the passage amount of refrigerant of the compressor (30) and the passage amount of refrigerant of the expander (31). If, with respect to the balance when the operation state is adequate, the amount of refrigerant passable through the compressor (30) is excessively small as compared to the amount of refrigerant passable through the expander (31), the liquid refrigerant expansion valve (53) is opened so that the density of refrigerant that is drawn into the compressor (30) increases. This makes it possible that the ratio of the passage amount of refrigerant of the compressor (30) and the passage amount of refrigerant of the expander (31) is adjusted to an adequate state. On the other hand, if, with respect to the balance when the operation state is adequate, the amount of refrigerant passable through the compressor (30) is excessively great as compared to the amount of refrigerant passable through the expander (31), the gas refrigerant expansion valve (36) is opened so that the density of refrigerant drawn into the compressor (30) decreases. This makes it possible that the ratio of the passage amount of refrigerant of the compressor (30) and the passage amount of refrigerant of the expander (31) is adjusted to an adequate state.

In addition, with respect to the third modification, the other end of the liquid supply pipe (52) may be connected downstream of the internal heat exchanger (45). In this case, the internal heat exchanger (45) is disposed astride the gas supply pipe (37), the liquid piping (38) and the liquid supply pipe (52).

In addition, the liquid supply pipe (52) may be arranged in the air conditioner (20) of the second modification. In this case, the internal heat exchanger (45), the gas refrigerant expansion valve (36), the liquid refrigerant expansion valve (53) and the return refrigerant expansion valve (55) constitute a cooling means (36, 45, 53, 55) according to the invention. If, in the cooling operation, the gas refrigerant expansion valve (36), the liquid refrigerant expansion valve (53) and the return refrigerant expansion valve (55) are all opened, the liquid refrigerant in the first flowpath (46) heading to the indoor circuit (11) is brought into heat exchange with the refrigerant reduced in temperature by the gas refrigerant expansion valve (36), with the refrigerant reduced in temperature by the liquid refrigerant expansion valve (53) and with the refrigerant reduced in temperature by the return refrigerant expansion valve (55).

Second Embodiment of the Invention

An air conditioner (20) of a second embodiment of the invention is formed by a refrigeration system (20) according to the invention, as in the first embodiment. Hereinafter, the difference of the second embodiment from the first embodiment will be described.

Figure 6:
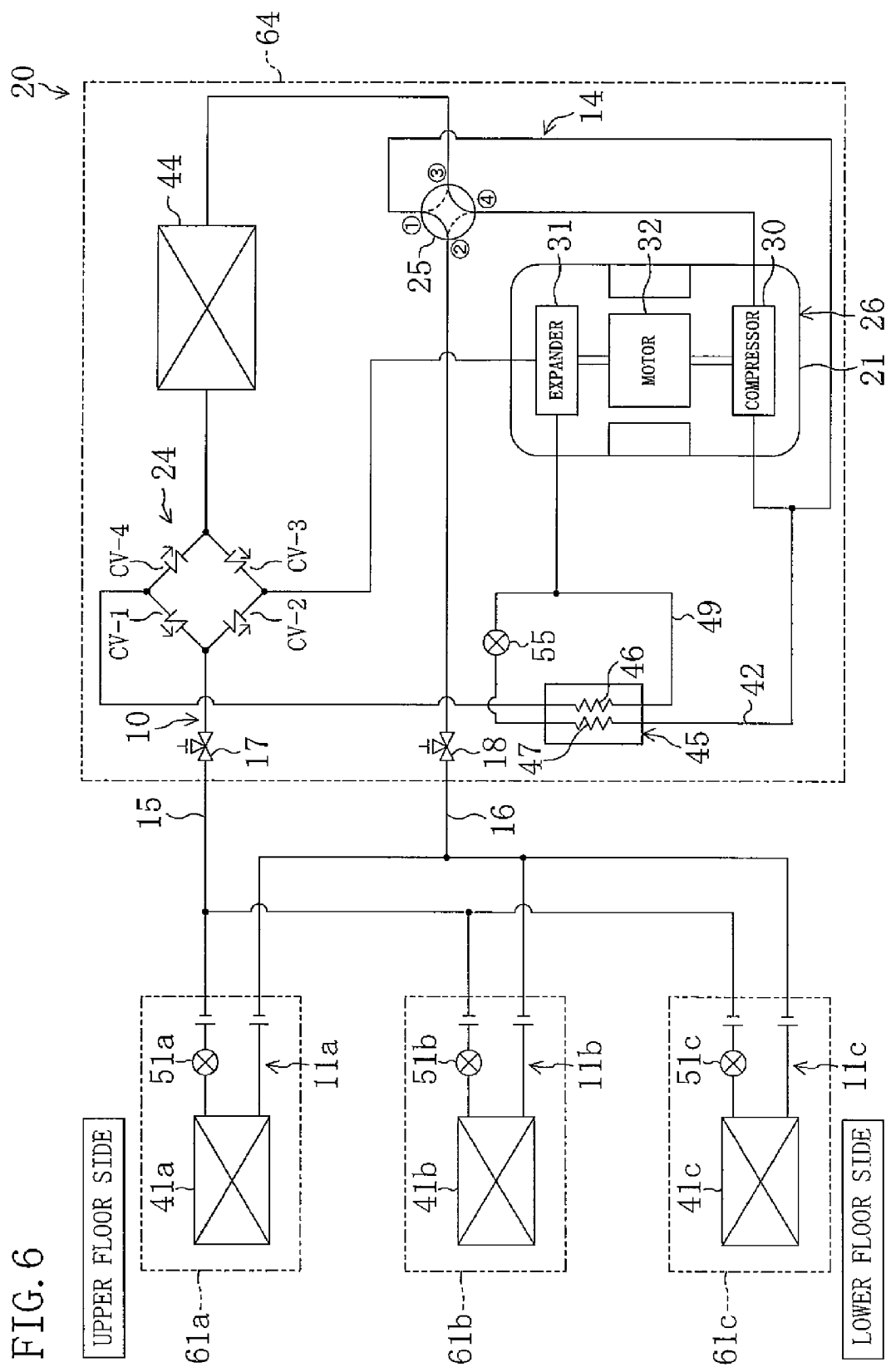
FIG. 6 is a schematic configuration diagram of an air conditioner according to a second embodiment of the invention.

As seen from FIG. 6, the gas-liquid separator (35) is not disposed in the outdoor circuit (14) of the second embodiment. In the outdoor circuit (14), the outflow side of the expander (31) is connected, through cooling piping (49) that passes through the internal heat exchanger (28) serving as a subcooling heat exchanger, to the bridge circuit (24).

One end of the injection pipe (42) is connected, upstream of the internal heat exchanger (28), to the cooling piping (49). The other end of the injection pipe (42) is connected to the suction side of the compressor (30). The injection pipe (42) is provided with a return refrigerant expansion valve (55) which is a return refrigerant pressure reducing mechanism. The return refrigerant expansion valve (55) is formed by an electronic expansion valve whose degree of opening is variable.

The internal heat exchanger (28) is arranged astride the injection pipe (42) and the cooling piping (49). The internal heat exchanger (28) has a first flowpath (46) which is a part of the cooling piping (49) and a second flowpath (47) which is a part of the injection pipe (42). The internal heat exchanger (28) is configured such that heat is exchanged between the refrigerant in the first flowpath (46) and the refrigerant in the second flowpath (47), whereby the refrigerant in the first flowpath (46) changes state to a subcooled state.

In the space cooling operation, the return refrigerant expansion valve (55) is placed in the opened state. Upon the opening of the return refrigerant expansion valve (55), some of the liquid refrigerant heading from the expander (31) to the indoor circuit (11) flows into the injection pipe (42). The liquid refrigerant admitted to the injection pipe (42) is reduced in pressure by the return refrigerant expansion valve (55) and then flows into the second flowpath (47). In the internal heat exchanger (28), heat is exchanged between the refrigerant in the first flowpath (46) from the expander (31) and the refrigerant in the second flowpath (47). As a result, the refrigerant in the first flowpath (46) heading to the indoor circuit (11) changes state to a subcooled state.

Modifications of the Second Embodiment

Figure 7:
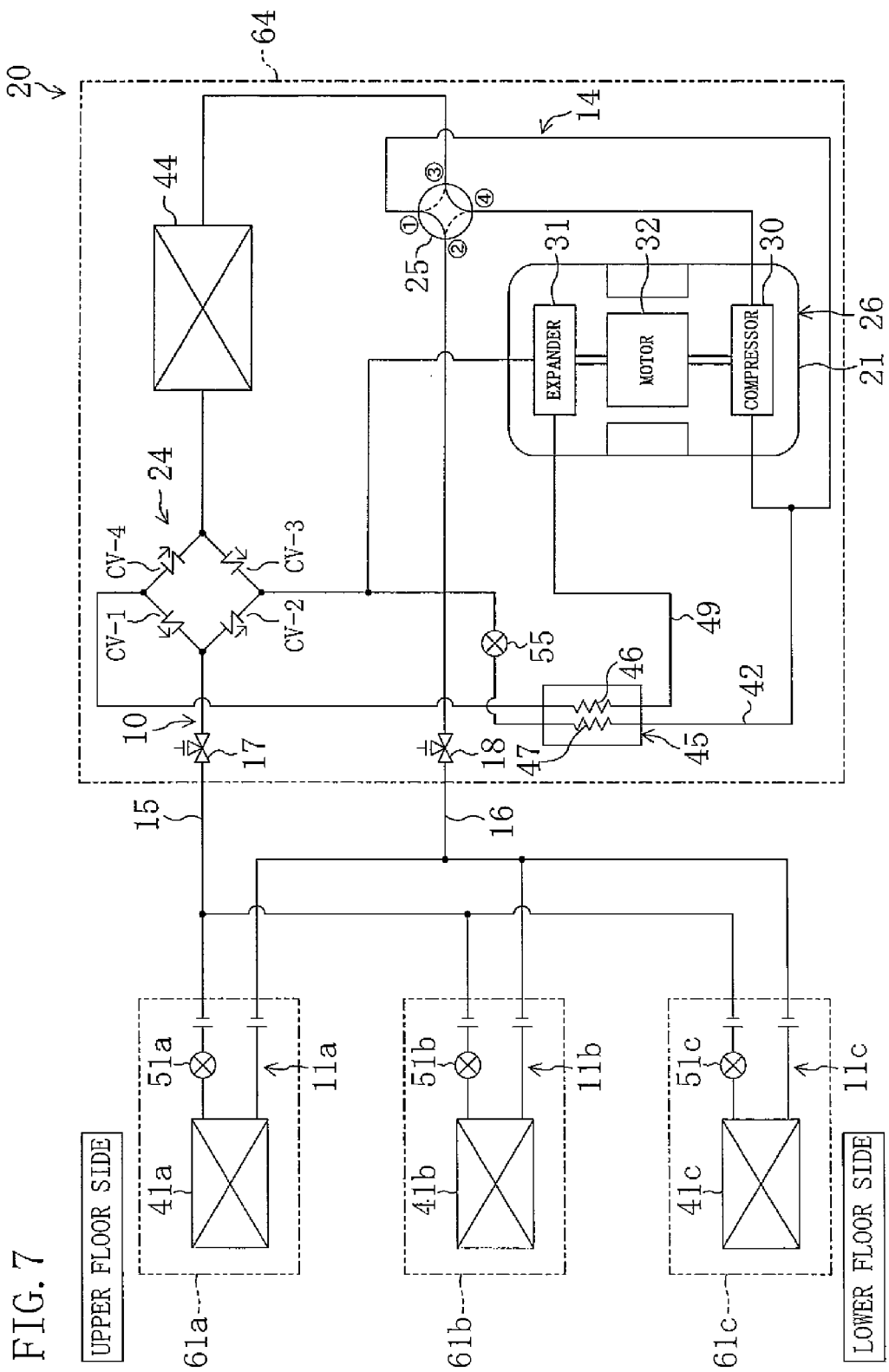
FIG. 7 is a schematic configuration diagram of an air conditioner according to a modification of the second embodiment.

The following is a description of a modification of the second embodiment. In this modification, one end of the injection pipe (42) is connected between the bridge circuit (24) and the inflow side of the expander (31), as shown in FIG. 7.

Other Embodiments

The foregoing embodiments may be configured as shown in the following modifications.

First Modification

Figure 8:
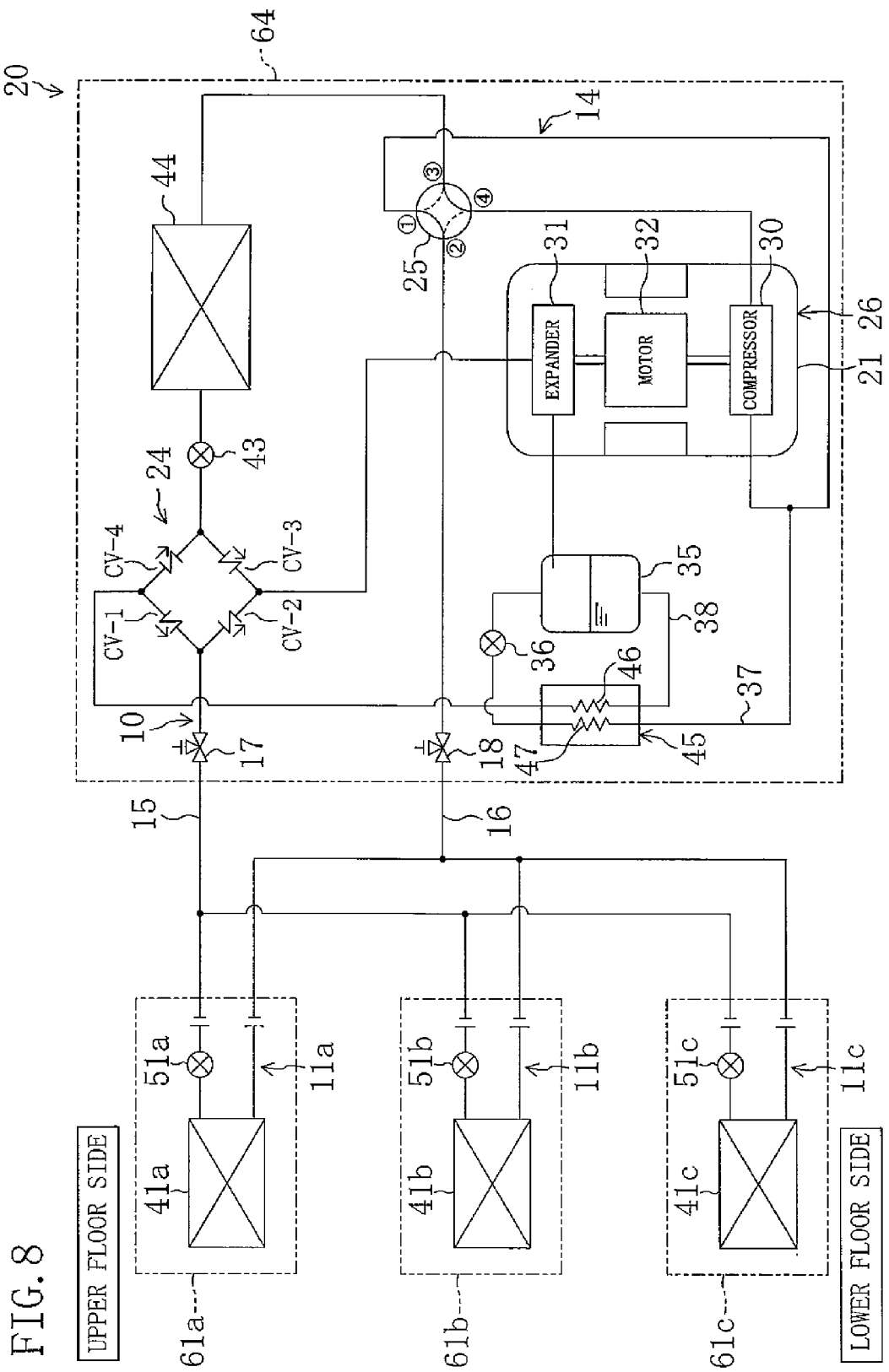
FIG. 8 is a schematic configuration diagram of an air conditioner according to a first modification of another embodiment of the invention.

With respect to the foregoing embodiments, it may be arranged that there is mounted between the outdoor heat exchanger (44) and the bridge circuit (24) an outdoor expansion valve (43) whose degree of opening is variable, as shown in FIG. 8. In the air conditioner (20) of the first modification, the outdoor expansion valve (43) is fully opened during the space cooling operation. On the other hand, in the space heating operation, the degree of opening of the outdoor expansion valve (43) is adjusted in order to control the degree of superheat of the refrigerant heading to the compressor (30).

Second Modification

Figure 9:
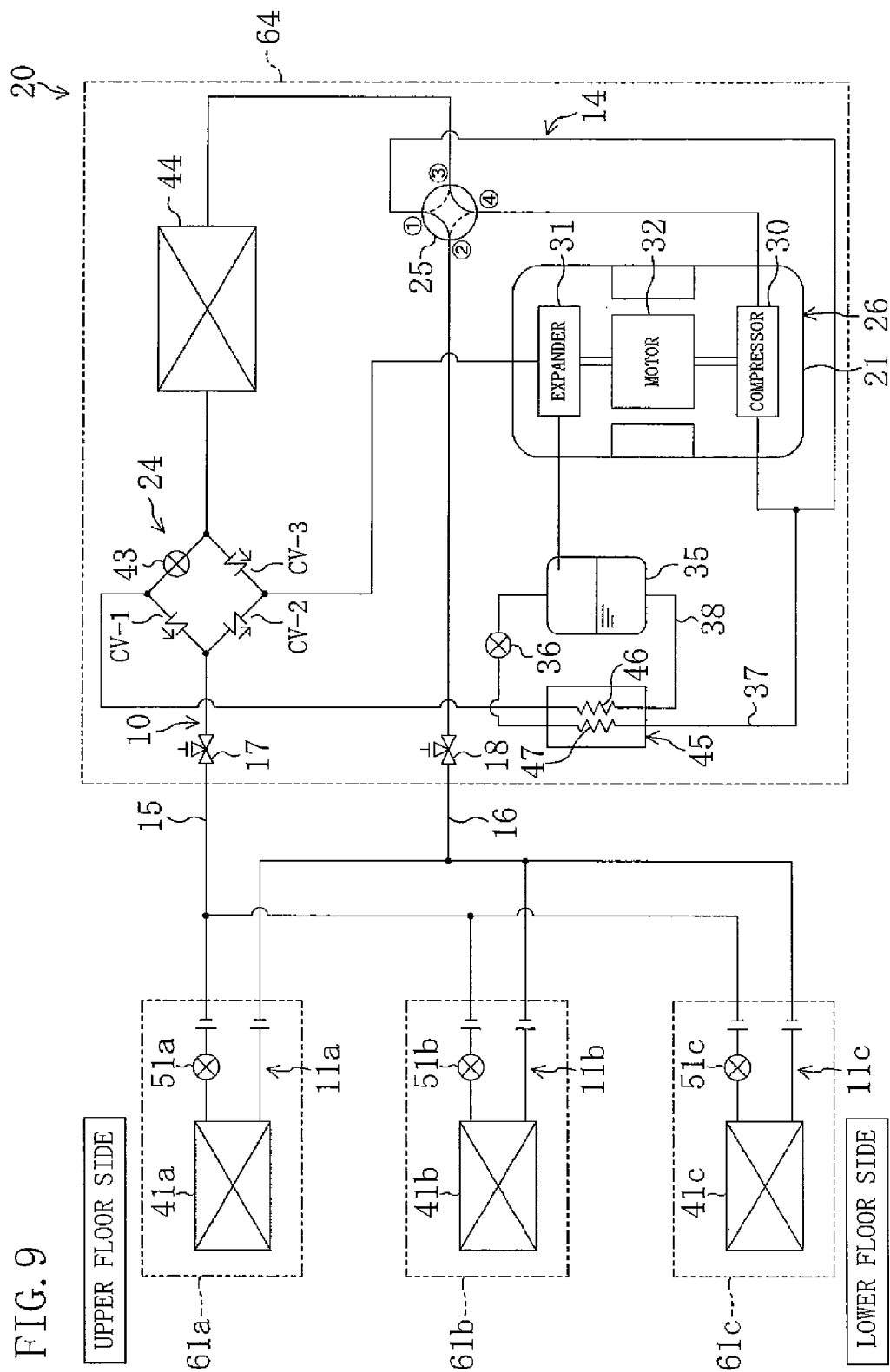
FIG. 9 is a schematic configuration diagram of an air conditioner according to a second modification of the other embodiment.

With respect to the foregoing embodiments, it may be arranged that an outdoor expansion valve (43) whose degree of opening is variable is provided as a substitute for the check valve (CV-4), as shown in FIG. 9. In the air conditioner (20) of the second modification, the outdoor expansion valve (43) is fully closed in the space cooling operation. On the other hand, in the space heating operation, the degree of opening of the outdoor expansion valve (43) is adjusted in order that the degree of superheat of the refrigerant heading to the compressor (30) may become constant.

Third Modification

Figure 10:
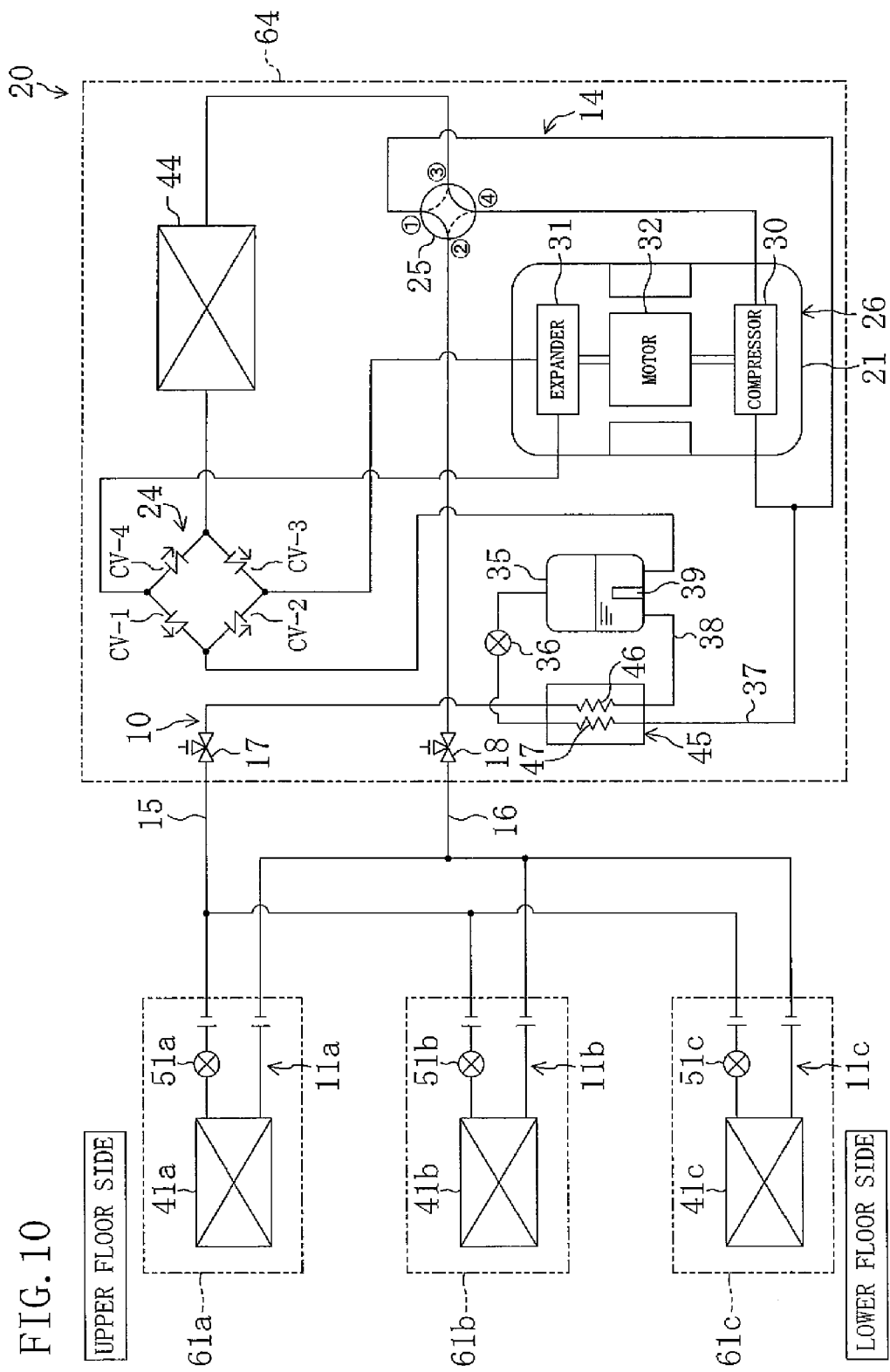
FIG. 10 is a schematic configuration diagram of an air conditioner according to a third modification of the other embodiment.

With respect to the foregoing embodiments, it may be arranged that the outflow side of the expander (31) is connected to the inflow side of each of the first and fourth check valves (CV-1, CV-4) in the bridge circuit (24) and the bottom of the gas-liquid separator (35) is connected to the outflow side of the first check valve (CV-1) and to the inflow side of the second check valve (CV-2) in the bridge circuit (24), as shown in FIG. 10. In this case, the liquid piping (38) is connected to the first closing valve (17). In addition, in the gas-liquid separator (35), a baffle plate (39) is mounted such that it is erected on the bottom. The baffle plate (39) is disposed between the position where the liquid piping (38) is opened and the position where the refrigerant piping from the bridge circuit (24) is opened. This arrangement makes it possible that, although refrigerant in a gas-liquid two-phase state flows in from the bridge circuit (24) during the space cooling operation, gas refrigerant is prevented by the baffle plate (39) from flowing out from the liquid piping (38) as a mixture with liquid refrigerant.

Fourth Modification

Figure 11:
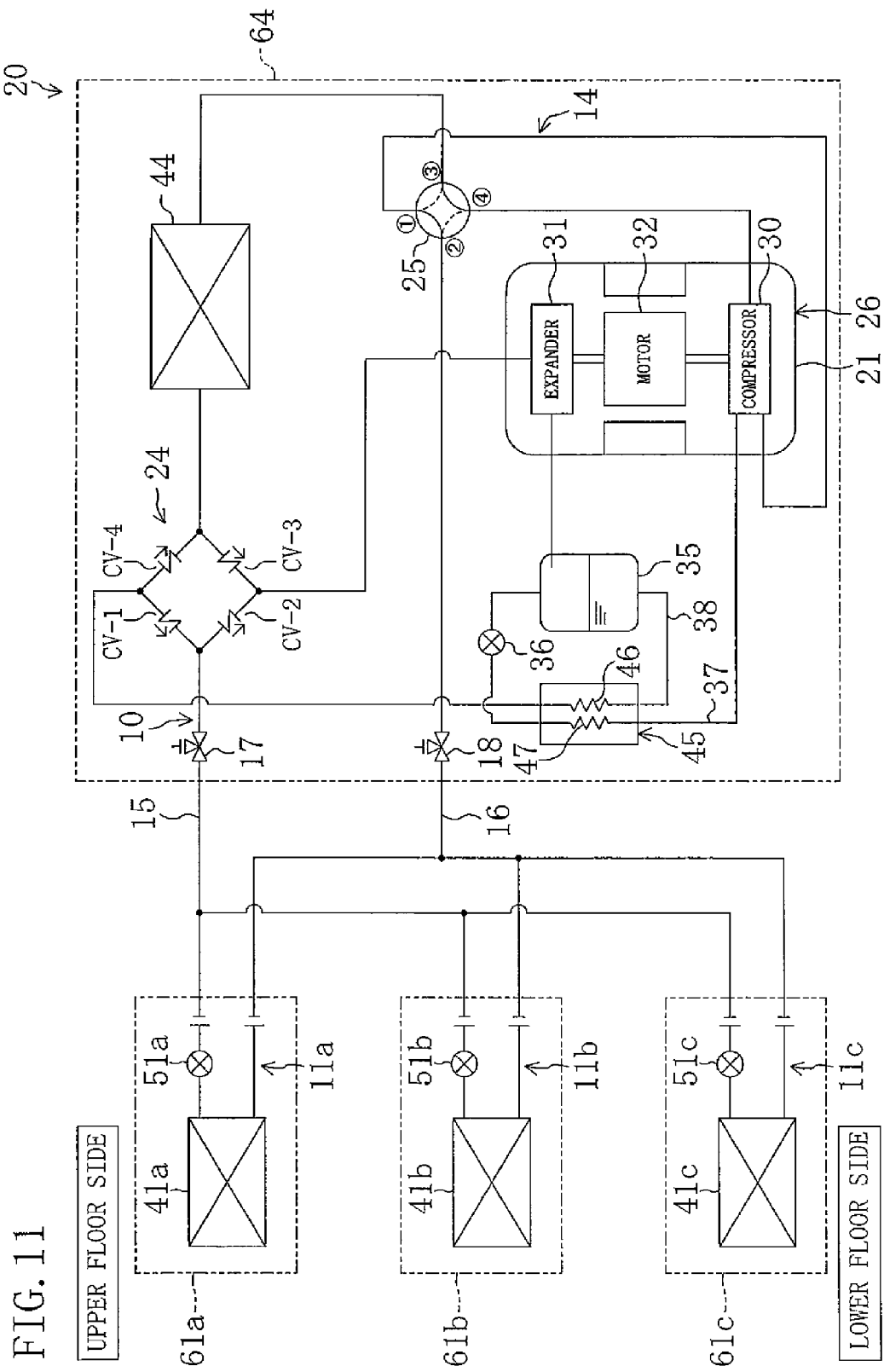
FIG. 11 is a schematic configuration diagram of an air conditioner according to a fourth modification of the other embodiment.

With respect to the foregoing embodiments, it may be arranged that the gas supply pipe (37) is not connected to the suction side of the compressor (30) but is connected such that it is opened to a space in the middle of a compression process, as shown in FIG. 11. In addition, although not shown, the injection pipe (42) may be connected in the same manner as described above.

Fifth Modification

Figure 12:
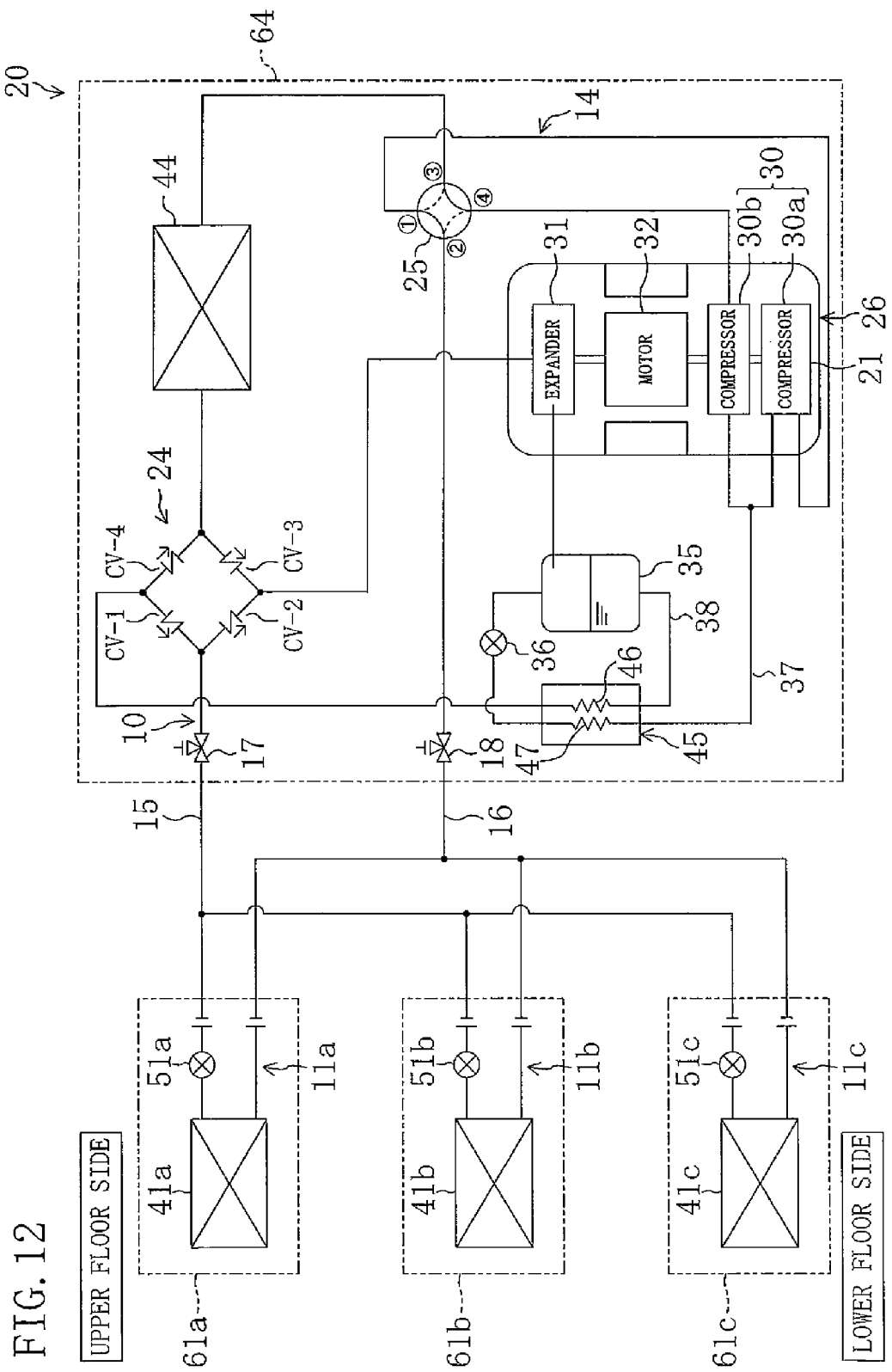
FIG. 12 is a schematic configuration diagram of an air conditioner according to a fifth modification of the other embodiment.

With respect to the foregoing embodiments, it may be arranged that the compressor (30) may be composed of a lower-stage side compression mechanism (30a) and a higher-stage side compression mechanism (30b), as shown in FIG. 12. The lower-stage side compression mechanism (30a) and the higher-stage side compression mechanism (30b) are connected together in series. That is, the compressor (30) is configured such that it performs two-stage compression, that is, the refrigerant compressed in the lower-stage side compression mechanism (30a) is drawn into the high-stage side compression mechanism (30b) for further compression. In this case, the gas supply pipe (37) may be connected to the suction side of the higher-stage side compression mechanism (30b). In addition, although not shown, the injection pipe (42) may be connected in the same manner as described above.

Sixth Modification

Figure 13:
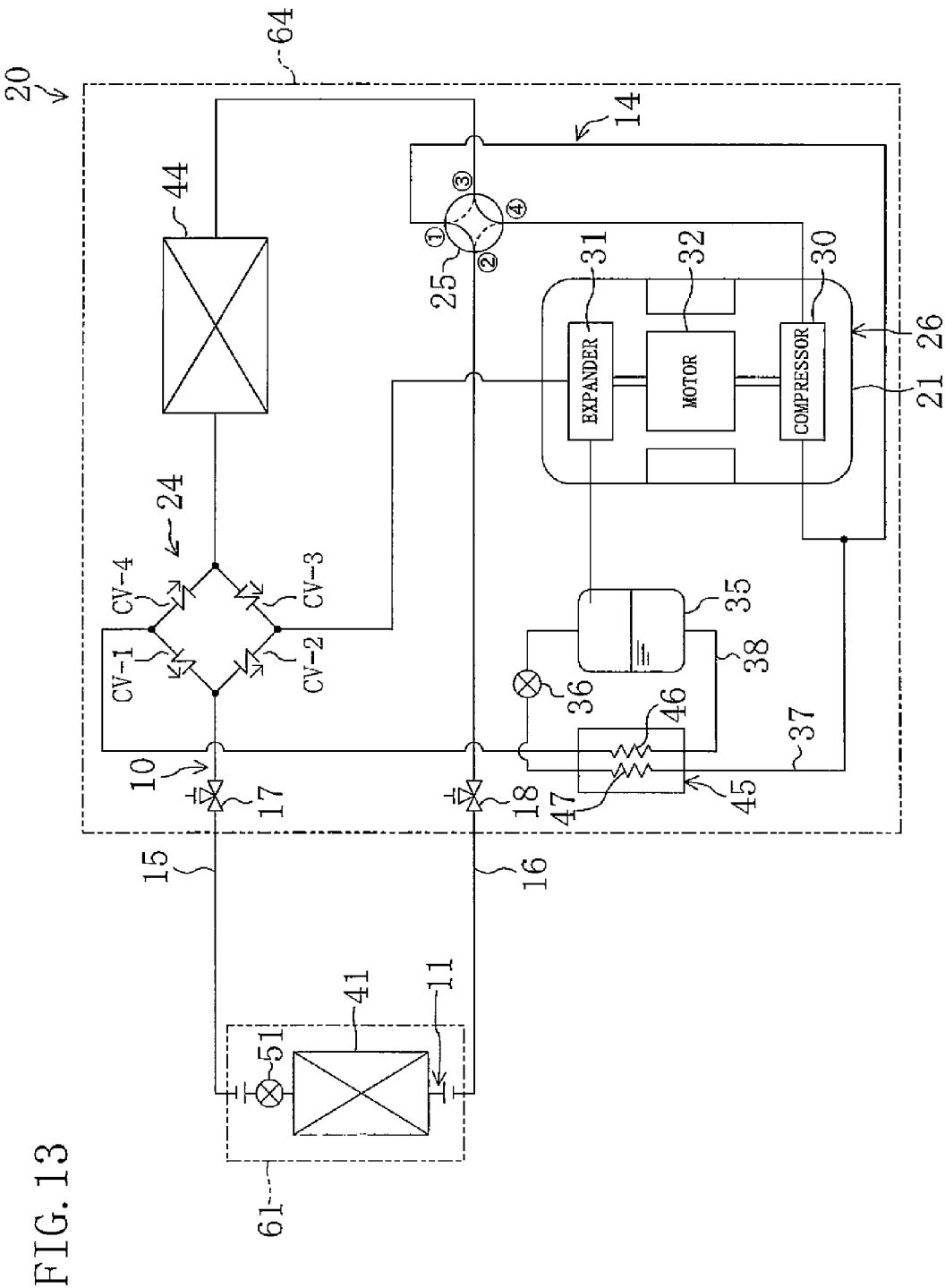
FIG. 13 is a schematic configuration diagram of an air conditioner according to a sixth modification of the other embodiment.

Although the plural indoor units (61) are provided in the foregoing embodiments, it is possible to provide only a single indoor unit (61), as shown in FIG. 13.

Seventh Modification

With respect to the foregoing embodiments, the indoor expansion valve (51) may not be mounted in the indoor unit (61). In accordance with the seventh modification, refrigerant in a liquid single-phase state flows into the indoor heat exchanger (41). Accordingly, in the case where the indoor heat exchanger (41) is composed of a heat transfer tube arrayed in a plurality of paths, it is prevented that there is generated a bias in the state of refrigerant depending on the position of the heat transfer tube.

It is to be understood that the above-described embodiments are merely exemplary in nature and are no way intended to limit the scope of the present invention, its application or its range of application.

INDUSTRIAL APPLICABILITY

As has been described above, the present invention finds its utility for a refrigeration system capable of performing a cooling operation in which refrigerant is circulated in a refrigerant circuit so that a heat source side heat exchanger functions as a condenser while a utilization side heat exchanger functions as an evaporator.

What is claimed is:

1. A refrigeration system comprising a refrigerant circuit in which a heat source side circuit including a compressor, an expander and a heat source side heat exchanger and a utilization side circuit including a utilization side heat exchanger are connected together for the performing of a refrigeration cycle by the circulation of refrigerant, which system is capable of carrying out a cooling operation in which the heat source side heat exchanger functions as a condenser while the utilization side heat exchanger functions as an evaporator,
wherein the heat source side circuit includes a gas-liquid separator for the separation of refrigerant flowing therein from the expander into liquid refrigerant and gas refrigerant and cooling unit that cools liquid refrigerant heading from the gas-liquid separator to the utilization side circuit in the cooling operation, and
wherein the cooling unit includes:
a gas refrigerant pressure reducing mechanism, disposed in a gas supply pipe for the feeding of gas refrigerant within the gas-liquid separator to the compressor, for the pressure reduction of the refrigerant in the gas supply pipe; and
a cooling heat exchanger for the cooling of the liquid refrigerant heading from the gas-liquid separator to the utilization side circuit in the cooling operation by the exchange of heat with the refrigerant reduced in pressure by the gas refrigerant pressure reducing mechanism.

2. The refrigeration system of claim 1,
wherein the utilization side circuit includes, upstream of the utilization side heat exchanger in the cooling operation, a utilization side expansion valve whose degree of opening is variable.

3. The refrigeration system of claim 1,
wherein the cooling unit includes a liquid refrigerant pressure reducing mechanism, disposed in a liquid supply pipe for the feeding of some of the liquid refrigerant heading from the gas-liquid separator to the utilization side circuit to the cooling heat exchanger, for the pressure reduction of the refrigerant in the liquid supply pipe; and
wherein, in the cooling heat exchanger, the liquid refrigerant heading from the gas-liquid separator to the utilization side circuit in the cooling operation is heat exchangeable also with the refrigerant reduced in pressure by the liquid refrigerant pressure reducing mechanism.

4. The refrigeration system of either claim 2 or claim 3,
wherein the cooling unit includes a return refrigerant pressure reducing mechanism, disposed in an injection pipe for the feeding of some of the refrigerant condensed in the heat source side heat exchanger to the compressor, for the pressure reduction of the refrigerant in the injection pipe; and
wherein, in the cooling heat exchanger, the liquid refrigerant heading from the gas-liquid separator to the utilization side circuit in the cooling operation is heat exchangeable also with the refrigerant reduced in pressure by the return refrigerant pressure reducing mechanism.

5. A refrigeration system comprising a refrigerant circuit in which a heat source side circuit including a compressor, an expander and a heat source side heat exchanger and a utilization side circuit including a utilization side heat exchanger are connected together for the performing of a refrigeration cycle by the circulation of refrigerant, which system is capable of carrying out a cooling operation in which the heat source side heat exchanger functions as a condenser while the utilization side heat exchanger functions as an evaporator, wherein
the heat source side circuit includes a gas-liquid separator for the separation of refrigerant flowing therein from the expander into liquid refrigerant and gas refrigerant and unit that cools for the cooling of liquid refrigerant heading from the gas-liquid separator to the utilization side circuit in the cooling operation, and
the cooling unit includes:
a return refrigerant pressure reducing mechanism, disposed in an injection pipe for the feeding of some of the refrigerant condensed in the heat source side heat exchanger to the compressor, for the pressure reduction of the refrigerant in the injection pipe; and
a cooling heat exchanger for the cooling of the liquid refrigerant heading from the gas-liquid separator to the utilization side circuit in the cooling operation by the exchange of heat with the refrigerant reduced in pressure by the return refrigerant pressure reducing mechanism.

6. The refrigeration system of claim 1, further comprising a gas supply pipe for the feeding of gas refrigerant within the gas-liquid separator to a suction side of the compressor.

7. The refrigeration system of claim 1, wherein in the refrigerant circuit, the refrigerant is circulated so that high pressure of the refrigeration cycle is higher than critical pressure of the refrigerant.

8. The refrigeration system of claim 7, wherein the refrigerant circuit is charged with carbon dioxide as the refrigerant.

9. The refrigeration system of claim 8, wherein
the cooling heat exchanger allows the liquid refrigerant heading from the gas-liquid separator to the utilization side circuit to exchange heat with the refrigerant, which is brought to a gas-liquid two-phase state by reducing pressure in the gas refrigerant pressure reducing mechanism, and cools the liquid refrigerant to a supercooled state, and
the liquid refrigerant brought to the supercooled state by the cooling heat exchanger is supplied to the utilization side circuit while remaining in a liquid single-phase state.

10. A refrigeration system comprising a refrigerant circuit in which a heat source side circuit including a compressor, an expander and a heat source side heat exchanger and a utilization side circuit including a utilization side heat exchanger are connected together for the performing of a refrigeration cycle by the circulation of refrigerant, which system is capable of carrying out a cooling operation in which the heat source side heat exchanger functions as a condenser while the utilization side heat exchanger functions as an evaporator,
wherein the heat source side circuit includes:
a return refrigerant pressure reducing mechanism, disposed in an injection pipe for the feeding of some of the refrigerant downstream of the heat source side heat exchanger to the compressor in the cooling operation, for the pressure reduction of the refrigerant in the injection pipe; and
a subcooling heat exchanger in which the refrigerant heading from the expander to the utilization side circuit in the cooling operation is brought into heat exchange with the refrigerant reduced in pressure by the return refrigerant pressure reducing mechanism so as to thereby be cooled to a subcooled state.

11. The refrigeration system of either one of claim 1, claim 5, or claim 10, wherein the compressor and the expander are connected together by a single drive shaft.

12. The refrigeration system of either one of claim 1, claim 5, or claim 10, wherein a plurality of the utilization side circuits are arranged in the refrigerant circuit and are each connected in parallel to the heat source side circuit.

13. The refrigeration system of either claim 5 or claim 10, wherein, in the refrigerant circuit, the refrigerant is circulated such that the high pressure of the refrigeration cycle exceeds the critical pressure of the refrigerant.

14. The refrigeration system of claim 13, wherein the refrigerant circuit is charged with carbon dioxide as the refrigerant.

* * * * *